United States Patent
Becker et al.

(10) Patent No.: US 12,141,423 B2
(45) Date of Patent: Nov. 12, 2024

(54) TECHNIQUES FOR MANIPULATING COMPUTER GRAPHICAL OBJECTS

(71) Applicant: Apple Inc., Cupertino, CA (US)

(72) Inventors: Zachary Z. Becker, Kirkland, WA (US); Michelle Chua, Seattle, WA (US); David A. Lipton, San Mateo, CA (US); Robin Yann Joram Storm, Santa Clara, CA (US); Eric G. Thivierge, Merchantville, NJ (US); Jue Wang, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/807,226

(22) Filed: Jun. 16, 2022

(65) Prior Publication Data

US 2022/0413691 A1    Dec. 29, 2022

Related U.S. Application Data

(60) Provisional application No. 63/216,397, filed on Jun. 29, 2021.

(51) Int. Cl.
  *G06F 3/04845*    (2022.01)
  *G06F 3/04815*    (2022.01)
  *G06F 3/04842*    (2022.01)

(52) U.S. Cl.
  CPC ...... *G06F 3/04845* (2013.01); *G06F 3/04815* (2013.01); *G06F 3/04842* (2013.01)

(58) Field of Classification Search
  CPC ............. G06F 3/04815; G06F 3/04842; G06F 3/04845
  See application file for complete search history.

(56) References Cited

U.S. PATENT DOCUMENTS

| 5,809,267 | A | 9/1998 | Moran et al. |
| 6,295,069 | B1 * | 9/2001 | Shirur ................. G06F 3/04815 |
| | | | 345/420 |

(Continued)

FOREIGN PATENT DOCUMENTS

| GB | 2540791 A | 2/2017 |
| WO | 2019/172678 A1 | 9/2019 |

(Continued)

OTHER PUBLICATIONS

Adding Environments, Available online at: https://manual.keyshot.com/manual/environments/adding-environments/, [retrieved on Jun. 9, 2023], 2 pages.

(Continued)

*Primary Examiner* — Kavita Stanley
*Assistant Examiner* — William Wong
(74) *Attorney, Agent, or Firm* — Kubota & Basol LLP

(57) ABSTRACT

A computer-generated virtual object manipulator having one or more affordances for manipulating a computer-generated virtual object is disclosed. Selection of a virtual object can cause an object manipulator to be displayed over the virtual object. The object manipulator can include a cone-shaped single-axis translation affordance for each of one or more object axes, a disc-shaped single-axis scale affordance for each of the one or more object axes, an arc-shaped rotation affordance for rotation about each of the one or more object axes, and a center of object affordance for free space movement of the virtual object. The object manipulator can also include a slice-shaped two-axis translation affordance that can be displayed after hovering over an area in a particular plane.

20 Claims, 8 Drawing Sheets

(56) References Cited

U.S. PATENT DOCUMENTS

| | | | |
|---|---|---|---|
| 6,426,745 B1* | 7/2002 | Isaacs | G06F 3/04845 |
| | | | 345/619 |
| 6,750,873 B1 | 6/2004 | Bernardini et al. | |
| 7,298,370 B1* | 11/2007 | Middler | G06T 11/206 |
| | | | 345/440 |
| 9,294,757 B1 | 3/2016 | Lewis et al. | |
| 9,396,580 B1 | 7/2016 | Nowrouzezahrai et al. | |
| 9,519,371 B2* | 12/2016 | Nishida | G06F 3/0416 |
| 10,671,241 B1* | 6/2020 | Jia | G06T 19/20 |
| 11,204,678 B1 | 12/2021 | Baker et al. | |
| 11,641,460 B1 | 5/2023 | Geusz et al. | |
| 11,847,748 B2 | 12/2023 | Liu et al. | |
| 2002/0030692 A1 | 3/2002 | Griesert | |
| 2005/0062738 A1 | 3/2005 | Handley et al. | |
| 2005/0248299 A1 | 11/2005 | Chemel et al. | |
| 2010/0302245 A1 | 12/2010 | Best | |
| 2011/0142321 A1* | 6/2011 | Huffman | H04N 21/8146 |
| | | | 382/131 |
| 2012/0113223 A1 | 5/2012 | Hilliges et al. | |
| 2012/0170089 A1 | 7/2012 | Kim et al. | |
| 2013/0222227 A1 | 8/2013 | Johansson et al. | |
| 2013/0321462 A1 | 12/2013 | Salter et al. | |
| 2013/0332890 A1 | 12/2013 | Ramic et al. | |
| 2014/0040832 A1* | 2/2014 | Regelous | G06F 3/04815 |
| | | | 715/849 |
| 2014/0078176 A1 | 3/2014 | Kim et al. | |
| 2014/0104206 A1 | 4/2014 | Anderson | |
| 2014/0129990 A1* | 5/2014 | Xin | G06F 3/04815 |
| | | | 715/849 |
| 2014/0333666 A1 | 11/2014 | Poulos et al. | |
| 2014/0368620 A1 | 12/2014 | Li et al. | |
| 2015/0067580 A1 | 3/2015 | Um et al. | |
| 2015/0153833 A1 | 6/2015 | Pinault et al. | |
| 2015/0317831 A1 | 11/2015 | Ebstyne et al. | |
| 2015/0331576 A1 | 11/2015 | Piya et al. | |
| 2016/0189426 A1 | 6/2016 | Thomas et al. | |
| 2016/0225164 A1 | 8/2016 | Tomlin et al. | |
| 2017/0032568 A1 | 2/2017 | Gharpure et al. | |
| 2017/0052595 A1 | 2/2017 | Poulos et al. | |
| 2017/0053383 A1 | 2/2017 | Heo | |
| 2017/0178392 A1 | 6/2017 | Zuccarino et al. | |
| 2017/0213388 A1 | 7/2017 | Margolis et al. | |
| 2017/0221264 A1 | 8/2017 | Perry | |
| 2017/0243352 A1 | 8/2017 | Kutliroff et al. | |
| 2017/0251143 A1 | 8/2017 | Peruch et al. | |
| 2017/0270715 A1 | 9/2017 | Lindsay et al. | |
| 2017/0287215 A1 | 10/2017 | Lalonde et al. | |
| 2017/0287225 A1 | 10/2017 | Powderly et al. | |
| 2017/0351094 A1 | 12/2017 | Poulos et al. | |
| 2018/0005433 A1 | 1/2018 | Kohler et al. | |
| 2018/0088787 A1 | 3/2018 | Bereza et al. | |
| 2018/0103209 A1 | 4/2018 | Fischler et al. | |
| 2018/0122138 A1* | 5/2018 | Piya | G06T 17/10 |
| 2018/0130255 A1 | 5/2018 | Hazeghi et al. | |
| 2018/0143693 A1 | 5/2018 | Calabrese et al. | |
| 2018/0173404 A1 | 6/2018 | Smith | |
| 2018/0348986 A1 | 12/2018 | Sawaki | |
| 2019/0018479 A1 | 1/2019 | Minami | |
| 2019/0018498 A1 | 1/2019 | West et al. | |
| 2019/0050062 A1 | 2/2019 | Chen et al. | |
| 2019/0130622 A1 | 5/2019 | Hoover et al. | |
| 2019/0155495 A1 | 5/2019 | Klein et al. | |
| 2019/0164340 A1 | 5/2019 | Pejic et al. | |
| 2019/0228589 A1 | 7/2019 | Dascola et al. | |
| 2019/0340832 A1 | 11/2019 | Srinivasan et al. | |
| 2019/0349575 A1 | 11/2019 | Knepper et al. | |
| 2020/0045249 A1 | 2/2020 | Francois et al. | |
| 2020/0048825 A1 | 2/2020 | Schultz et al. | |
| 2020/0128227 A1 | 4/2020 | Chavez et al. | |
| 2020/0135141 A1 | 4/2020 | Day et al. | |
| 2020/0214682 A1* | 7/2020 | Zaslavsky | A61B 8/565 |
| 2020/0286299 A1 | 9/2020 | Wang et al. | |
| 2020/0379626 A1 | 12/2020 | Guyomard et al. | |
| 2021/0034319 A1 | 2/2021 | Wang et al. | |
| 2021/0225043 A1 | 7/2021 | Tang et al. | |
| 2021/0241483 A1 | 8/2021 | Dryer et al. | |
| 2021/0279967 A1 | 9/2021 | Gernoth et al. | |
| 2021/0295592 A1 | 9/2021 | Von Cramon | |
| 2021/0383097 A1 | 12/2021 | Guerard et al. | |
| 2022/0084279 A1 | 3/2022 | Lindmeier et al. | |
| 2022/0148257 A1 | 5/2022 | Boubekeur et al. | |
| 2022/0317776 A1 | 10/2022 | Sundstrom et al. | |
| 2022/0335697 A1 | 10/2022 | Harding et al. | |
| 2022/0414975 A1 | 12/2022 | Becker et al. | |
| 2023/0030699 A1 | 2/2023 | Zion et al. | |
| 2023/0031832 A1 | 2/2023 | Lipton et al. | |
| 2023/0032771 A1 | 2/2023 | Zion et al. | |
| 2023/0076326 A1 | 3/2023 | Xu et al. | |
| 2023/0119162 A1 | 4/2023 | Lipton et al. | |
| 2023/0290042 A1 | 9/2023 | Casella et al. | |
| 2023/0377259 A1 | 11/2023 | Becker et al. | |
| 2023/0377299 A1 | 11/2023 | Becker et al. | |
| 2023/0377300 A1 | 11/2023 | Becker et al. | |
| 2024/0037886 A1 | 2/2024 | Chiu et al. | |
| 2024/0103636 A1 | 3/2024 | Lindmeier et al. | |
| 2024/0104875 A1 | 3/2024 | Couche et al. | |
| 2024/0104876 A1 | 3/2024 | Couche et al. | |

FOREIGN PATENT DOCUMENTS

| | | |
|---|---|---|
| WO | 2019/213111 A1 | 11/2019 |
| WO | 2022/147146 A1 | 7/2022 |

OTHER PUBLICATIONS

Area Light, Available online at: https://manual.keyshot.com/manual/materials/material-types/light-sources/area-light/, [retrieved on Jun. 9, 2023], 24 pages.

Feature Highlights, Available online at: https://manual.keyshot.com/manual/whats-new/feature-highlights/, [retrieved on Jun. 9, 2023], 28 pages.

International Search Report received for PCT Patent Application No. PCT/US2021/049520, mailed on Apr. 8, 2022, 8 pages.

Light Manager, Available online at: https://manual.keyshot.com/manual/lighting/lighting-manager/, [retrieved on Jun. 9, 2023], 3 pages.

Non-Final Office Action received for U.S. Appl. No. 17/469,788, mailed on Mar. 2, 2023, 22 pages.

Artec Leo Full 3D Scanning Demo w/ Sample Data, Digitize Designs, LLC, Available online at: <https://www.youtube.com/watch?v=ecBKo_h3Pug>, [retrieved on Sep. 1, 2022], Feb. 22, 2019, 3 pages.

Final Office Action received for U.S. Appl. No. 17/469,788, mailed on Nov. 16, 2023, 24 pages.

Final Office Action received for U.S. Appl. No. 17/812,965, mailed on Jan. 31, 2024, 9 pages.

Slambekova, Dana, "Gaze and Gesture Based Object Interaction in Virtual World", [retrieved on Dec. 17, 2015]. Retrieved from the Internet: <URL:https://www.cs.rit.edu/~dxs4659/Report.pdf>, May 31, 2012, 54 pages.

International Search Report received for PCT Patent Application No. PCT/US2022/071208, mailed on Aug. 18, 2022, 9 pages.

International Search Report received for PCT Patent Application No. PCT/US2023/074955, mailed on Feb. 1, 2024, 6 pages.

Non-Final Office Action received for U.S. Appl. No. 17/469,788, mailed on Mar. 21, 2024, 24 pages.

Non-Final Office Action received for U.S. Appl. No. 17/812,965, mailed on Jun. 8, 2023, 8 pages.

Non-Final Office Action received for U.S. Appl. No. 17/814,455, mailed on Feb. 16, 2024, 24 pages.

Non-Final Office Action received for U.S. Appl. No. 17/814,462, mailed on Feb. 1, 2024, 30 pages.

Non-Final Office Action received for U.S. Appl. No. 17/905,483, mailed on Mar. 27, 2024, 16 pages.

Non-Final Office Action received for U.S. Appl. No. 18/317,893, mailed on Apr. 25, 2024, 18 pages.

Notice of Allowance received for U.S. Appl. No. 17/807,236, mailed on Feb. 5, 2024, 13 pages.

(56) References Cited

OTHER PUBLICATIONS

Notice of Allowance received for U.S. Appl. No. 18/317,893, mailed on Mar. 6, 2024, 8 pages.
Notice of Allowance received for U.S. Appl. No. 18/317,893, mailed on Nov. 22, 2023, 9 pages.
Restriction Requirement received for U.S. Appl. No. 17/905,483, mailed on Dec. 7, 2023, 7 pages.
Search Report received for United Kingdom Patent Application No. GB2210885.6, mailed on Jan. 27, 2023, 1 page.
Cas and Chary XR, "Oculus Go & Your Phone As 2nd Controller!!—An Inexpensive Way To Play PC VR Games", posted on Mar. 8, 2019, https://www.youtube.com/watch?v=i_iRVa0kemw, 2019, 4 pages.
Gamedbharat, "I Want to Rotate a Object on Double Tap, Can Any One Help Me With This?", posted on Jul. 26, 2017, https://discussions.unity.com/t/i-want-to-rotate-a-object-on-double-tap-can-any-one-help-me-with-this/192010, 2017, 3 pages.
Locher et al., "Mobile Phone and Cloud—a Dream Team for 3D Reconstruction", 2016 IEEE Winter Conference on Applications of Computer Vision (WACV), 2016, pp. 1-8.

\* cited by examiner

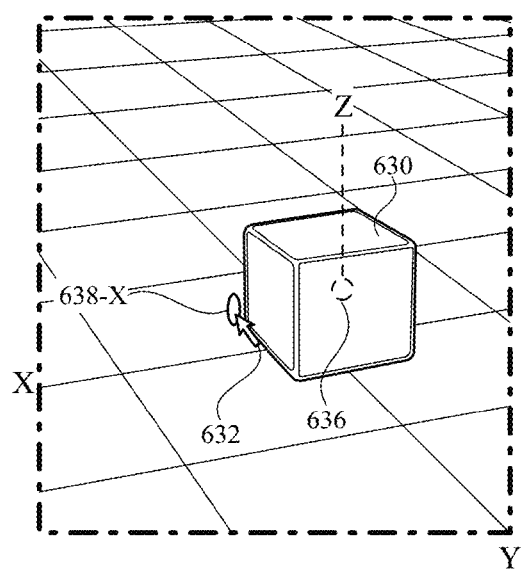
FIG. 6A
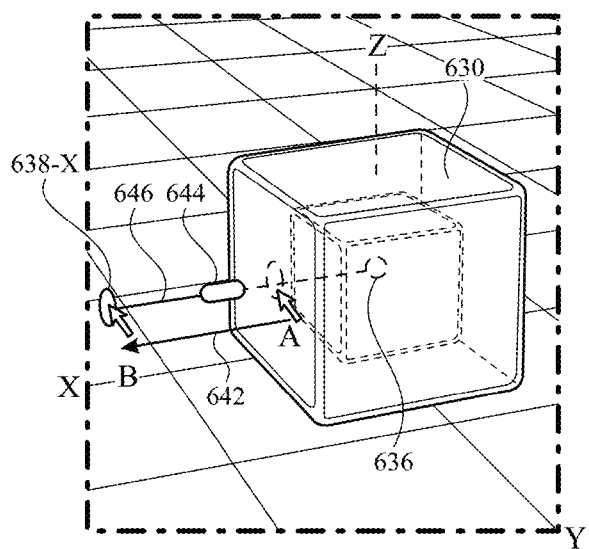 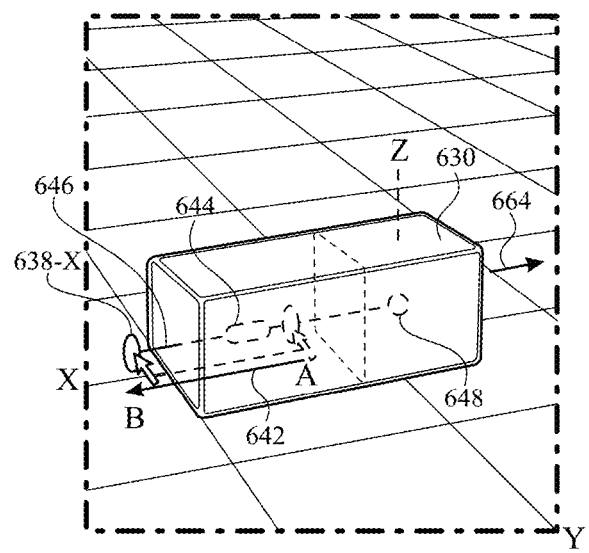
FIG. 6B          FIG. 6C

TECHNIQUES FOR MANIPULATING COMPUTER GRAPHICAL OBJECTS

CROSS-REFERENCE TO RELATED APPLICATIONS

This application claims the benefit of U.S. Provisional Application No. 63/216,397, filed Jun. 29, 2021, the content of which is hereby incorporated by reference in its entirety for all purposes.

FIELD OF THE DISCLOSURE

This relates generally to computer graphics editors.

BACKGROUND OF THE DISCLOSURE

Some computer graphical environments provide two-dimensional and/or three-dimensional environments where at least some objects displayed for a user's viewing are virtual and generated by a computer. In some uses, a user may create or modify computer graphical environments, such as by editing, generating, or otherwise manipulating computer graphical virtual objects using a content generation environment, such as a graphics editor or graphics editing interface. Editors that allow for intuitive editing of computer-generated virtual objects are desirable.

SUMMARY OF THE DISCLOSURE

Some examples of the disclosure are directed to a computer-generated virtual object manipulator having one or more affordances for manipulating a computer-generated virtual object. In some examples, selection of a virtual object can cause an object manipulator to be displayed over the virtual object. The object manipulator can include a cone-shaped single-axis translation affordance for each of one or more object axes, a disc-shaped single-axis scale affordance for each of the one or more object axes, an arc-shaped rotation affordance for rotation about each of the one or more object axes, and a center of object affordance for free space movement of the virtual object. The object manipulator can also include a slice-shaped two-axis translation affordance that can be displayed after selection.

Clicking on a particular single-axis translation affordance can cause some or all other affordances to disappear, and dragging that single-axis translation affordance along its associated object axis can cause a translation of the virtual object along that object axis. Clicking on a particular single-axis scale affordance can cause some or all other affordances to disappear, and dragging that single-axis scale affordance along its associated object axis can cause either a nonuniform scaling of the virtual object along that object axis, or a uniform scaling of the virtual object in all directions. Clicking on a particular arc-shaped rotation affordance can cause a complete ring to be displayed on the plane of the particular arc-shaped rotation affordance and can cause some or all other affordances to disappear, and dragging the selected rotation affordance along its ring can cause a rotation of the virtual object about its associated object axis. Hovering over an area in a plane defined by a rotation affordance can cause a slice-shaped two-axis translation affordance to appear, selection of that slice-shaped two-axis translation affordance can cause some or all other affordances to disappear, and dragging the selected two-axis translation affordance can cause a translation of the virtual object in two dimensions. Clicking and dragging the center of object affordance can cause a free space relocation of the virtual object in multiple dimensions. The full descriptions of these examples are provided in the Drawings and the Detailed Description, and it is understood that this Summary does not limit the scope of the disclosure in any way.

BRIEF DESCRIPTION OF THE DRAWINGS

For a better understanding of the various described embodiments, reference should be made to the Detailed Description below, in conjunction with the following drawings in which like reference numerals often refer to corresponding parts throughout the figures.

FIG. 6A illustrates the selection of a single-axis scale affordance for a virtual object according to examples of the disclosure.

FIG. 6B illustrates the uniform scaling of a virtual object using a scale affordance according to examples of the disclosure.

FIG. 6C illustrates the nonuniform scaling of a virtual object using a scale affordance according to examples of the disclosure.

DETAILED DESCRIPTION

Figure 1:
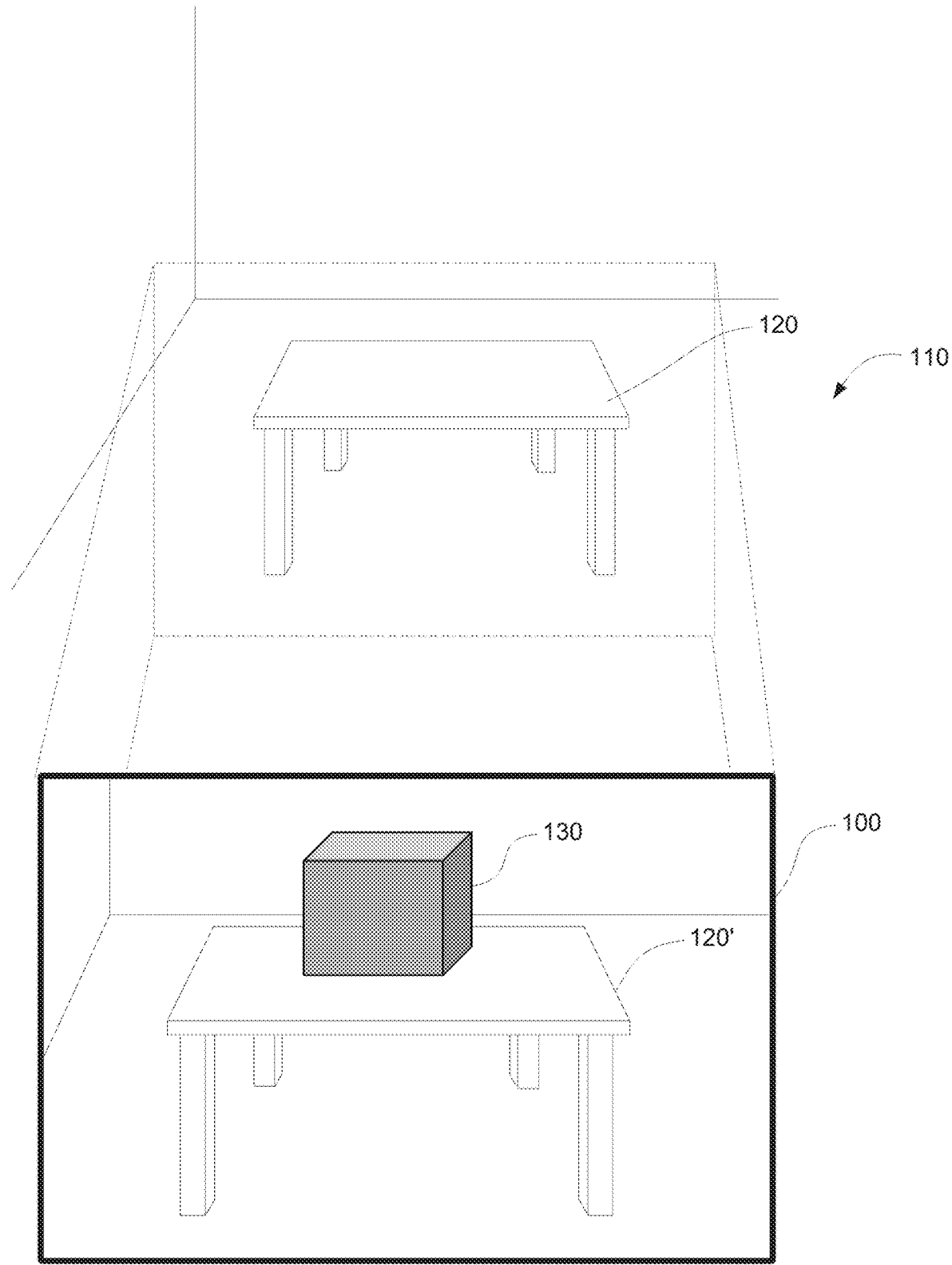
FIG. 1 illustrates an electronic device displaying an extended reality (XR) environment (e.g., a computer-generated environment) according to examples of the disclosure.

Computer graphical environments such as XR environments can include XR content. In some embodiments, XR content can be presented to the user via an XR file that includes data representing the XR content and/or data describing how the XR content is to be presented. In some embodiments, the XR file includes data representing one or more XR scenes and one or more triggers for presentation of the one or more XR scenes. For example, an XR scene may be anchored to a horizontal, planar surface, such that when a horizontal, planar surface is detected (e.g., in the field of view of one or more cameras), the XR scene can be presented. The XR file can also include data regarding one or more virtual objects associated with the XR scene, and/or associated triggers and actions involving the XR virtual objects.

In order to simplify the generation of XR files and/or editing of computer-generated graphics generally, a computer graphics editor including a content generation environment (e.g., an authoring environment GUI) can be used. In some embodiments, a content generation environment is itself an XR environment (e.g., a two-dimensional and/or three-dimensional environment). For example, a content generation environment can include one or more virtual objects and one or more representations of real world objects. In some embodiments, the virtual objects are superimposed over a physical environment, or a representation thereof.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an XR environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

In some embodiments, the physical environment is captured via one or more cameras of the electronic device and is actively displayed in the XR environment (e.g., via the display generation component). In some embodiments, the physical environment is (e.g., passively) provided by the electronic device, for example, if the display generation component includes a translucent or transparent element through which the user is able to see the physical environment.

In such a content generation environment, a user can create virtual objects from scratch (including the appearance of the virtual objects, behaviors/actions of the virtual objects, and/or triggers for the behaviors/actions of the virtual objects). Additionally or alternatively, virtual objects can be created by other content creators and imported into the content generation environment, where the virtual objects can be placed into an XR environment or scene. In some embodiments, virtual objects generated in a content generation environment or entire environments can be exported to other environments or XR scenes (e.g., via generating an XR file and importing or opening the XR file in a computer graphics editor application or XR viewer application).

In some embodiments, the authoring environment GUI can include one or more graphical user interface elements to enable one or more transformations of a virtual object. A graphical user interface element to transform a virtual object can be referred to herein as a "manipulator" or "manipulator element." The manipulator can be used to perform move, rotate or scale actions on the virtual object. In some embodiments, the manipulator can provide multiple elements to enable multiple transformation actions. In some embodiments, the manipulator can provide the ability to perform move, rotate and scale actions on the virtual object (e.g., as described herein with respect to manipulators). As used herein, the term "affordance" refers to a user-interactive graphical user interface manipulator that is, optionally, displayed on a display generation component.

Some examples of the disclosure are directed to a computer-generated virtual object manipulator having one or more affordances for manipulating a computer-generated virtual object. In some examples, selection of a virtual object can cause an object manipulator to be displayed over the virtual object. The object manipulator can include a cone-shaped single-axis translation affordance for each of one or more object axes, a disc-shaped single-axis scale affordance for each of the one or more object axes, an arc-shaped rotation affordance for rotation about each of the one or more object axes, and a center of object affordance for free space movement of the virtual object. The object manipulator can also include a slice-shaped two-axis translation affordance that can be displayed after selection.

Clicking on a particular single-axis translation affordance can cause some or all other affordances to disappear, and dragging that single-axis translation affordance along its associated object axis can cause a translation of the virtual object along that object axis. Clicking on a particular single-axis scale affordance can cause some or all other affordances to disappear, and dragging that single-axis scale affordance along its associated object axis can cause either a nonuniform scaling of the virtual object along that object axis, or a uniform scaling of the virtual object in all directions. Clicking on a particular arc-shaped rotation affordance can cause a complete ring to be displayed on the plane of the particular arc-shaped rotation affordance and can cause some or all other affordances to disappear, and dragging the selected rotation affordance along its ring can cause a rotation of the virtual object about its associated object axis. Hovering over an area in a plane defined by a rotation affordance can cause a slice-shaped two-axis translation affordance to appear, selection of that slice-shaped two-axis translation affordance can cause some or all other affordances to disappear, and dragging the selected two-axis translation affordance can cause a translation of the virtual object in two dimensions. Clicking and dragging the center of object affordance can cause a free space relocation of the virtual object in multiple dimensions. The full descriptions of these examples are provided in the Drawings and the Detailed Description, and it is understood that this Summary does not limit the scope of the disclosure in any way.

There are many different types of electronic systems that enable a person to sense and/or interact with various XR environments. Embodiments of electronic devices and user interfaces for such systems are described. In some embodiments, the device is a portable communications device, such as a laptop or tablet computer. In some embodiments, the device is a mobile telephone that also contains other functions, such as personal digital assistant (PDA) and/or music player functions. In some embodiments, the device is a wearable device, such as a watch, a head-mounted display, etc.

Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

It should also be understood that, in some embodiments, the device is not a portable communications device, but is a desktop computer or a television. In some embodiments, the portable and non-portable electronic devices may optionally include touch-sensitive surfaces (e.g., touch screen displays and/or touch pads). In some embodiments, the device does not include a touch-sensitive surface (e.g., a touch screen display and/or a touch pad), but rather is capable of outputting display information (such as the user interfaces of the disclosure) for display on an integrated or external display device, and capable of receiving input information from an integrated or external input device having one or more input mechanisms (such as one or more buttons, a mouse, a touch screen display, stylus, and/or a touch pad). In some embodiments, the device has a display, but is capable of receiving input information from a separate input device having one or more input mechanisms (such as one or more buttons, a mouse, a touch screen display, and/or a touch pad).

In the discussion that follows, an electronic device that is in communication with a display generation component and one or more input devices is described. It should be understood, that the electronic device optionally is in communication with one or more other physical user-interface devices, such as touch-sensitive surface, a physical keyboard, a mouse, a joystick, a hand tracking device, an eye tracking device, a stylus, etc. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device, or touch input received on the surface of a stylus) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application. Additionally, the device may support an application for generating or editing content for computer generated graphics and/or XR environments (e.g., an application with a content generation environment).

The various applications that are executed on the device optionally use a common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

FIG. 1 illustrates an electronic device 100 displaying an XR environment (e.g., a computer-generated environment) according to examples of the disclosure. In some embodiments, electronic device 100 is a hand-held or mobile device, such as a tablet computer, laptop computer, smartphone, or head-mounted display. Examples of device 100 are described below with reference to the architecture block diagram of FIG. 2. As shown in FIG. 1, electronic device 100 and table 120 are located in the physical environment 110. In some embodiments, electronic device 100 may be configured to capture areas of physical environment 110 including table 120 (illustrated in the field of view of electronic device 100). In some embodiments, in response to a trigger, the electronic device 100 may be configured to display a virtual object 130 in the computer-generated environment (e.g., represented by a cube illustrated in FIG. 1) that is not present in the physical environment 110, but is displayed in the computer generated environment positioned on (e.g., anchored to) the top of a computer-generated representation 120' of real-world table 120. For example, virtual object 130 can be displayed on the surface of the table 120' in the computer-generated environment displayed via device 100 in response to detecting the planar surface of table 120 in the physical environment 110. It should be understood that virtual object 130 is a representative virtual object and one or more different virtual objects (e.g., of various dimensionality such as two-dimensional or three-dimensional virtual objects) can be included and rendered in a three-dimensional computer-generated environment. For example, the virtual object can represent an application or a user interface displayed in the computer-generated environment. In some examples, the application or user interface can include the display of content items (e.g., photos, video, etc.) of a content application. Additionally, it should be understood, that the 3D environment (or 3D virtual object) described herein may be a representation of a 3D environment (or three-dimensional virtual object) displayed in a two dimensional (2D) context (e.g., displayed on a 2D screen).

Figure 2:
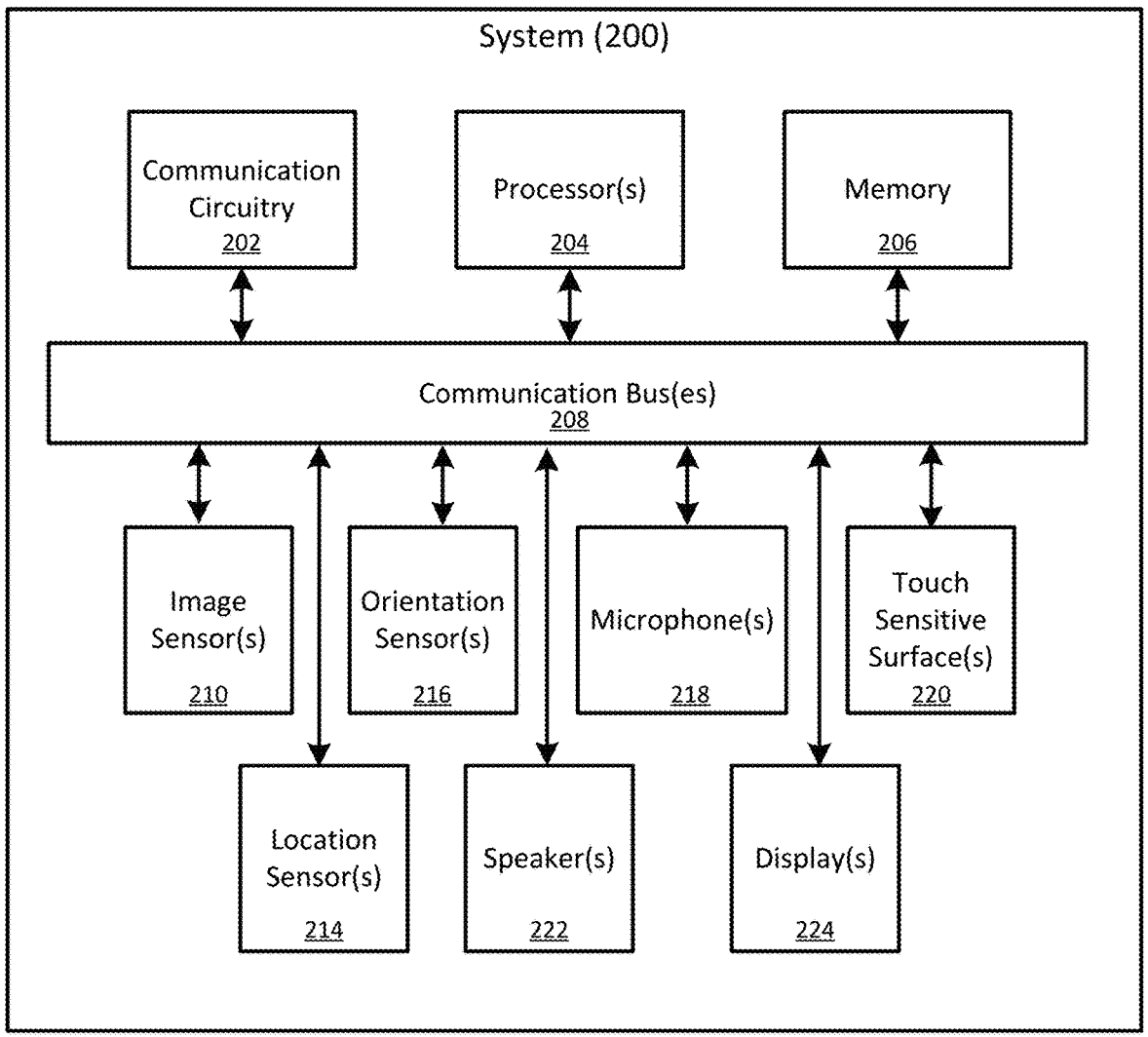
FIG. 2 illustrates a block diagram of an exemplary architecture for a system or device according to examples of the disclosure.

FIG. 2 illustrates a block diagram of an exemplary architecture for a system or device 200 according to examples of the disclosure. In some embodiments, device 200 is a mobile device, such as a mobile phone (e.g., smart phone), a tablet computer, a laptop computer, a desktop computer, a head-mounted display, an auxiliary device in communication with another device, etc. In some embodiments, as illustrated in FIG. 2, device 200 includes various components, such as communication circuitry 202, processor(s) 204, memory 206, image sensor(s) 210, location sensor(s) 214, orientation sensor(s) 216, microphone(s) 218, touch-sensitive surface(s) 220, speaker(s) 222, display generation component(s) 224, hand tracking sensor(s) 230, and/or eye tracking sensor(s) 232. These components optionally communicate over communication bus(es) 208 of device 200.

Device 200 includes communication circuitry 202. Communication circuitry 202 optionally includes circuitry for communicating with electronic devices, networks, such as the Internet, intranets, a wired network and/or a wireless network, cellular networks and wireless local area networks (LANs). Communication circuitry 202 optionally includes circuitry for communicating using near-field communication (NFC) and/or short-range communication, such as Bluetooth®.

Processor(s) 204 include one or more general processors, one or more graphics processors, and/or one or more digital signal processors. In some embodiments, memory 206 a non-transitory computer-readable storage medium (e.g., flash memory, random access memory, or other volatile or non-volatile memory or storage) that stores computer-readable instructions configured to be executed by processor(s) 204 to perform the techniques, processes, and/or methods described below. In some embodiments, memory 206 can including more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some embodiments, the storage medium is a transitory computer-readable storage medium. In some embodiments, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like.

Device 200 includes display generation component(s) 224. In some embodiments, display generation component(s) 224 include a single display (e.g., a liquid-crystal display (LCD), organic light-emitting diode (OLED), or other types of display). In some embodiments, display generation component(s) 224 includes multiple displays. In some embodiments, display generation component(s) 224 can include a display with touch capability (e.g., a touch screen), a projector, a holographic projector, a retinal projector, etc. In some embodiments, device 200 includes touch-sensitive surface(s) 220 for receiving user inputs, such as tap inputs and swipe inputs or other gestures. In some embodiments, display generation component(s) 224 and touch-sensitive surface(s) 220 form touch-sensitive display(s) (e.g., a touch screen integrated with device 200 or external to device 200 that is in communication with device 200).

Device 200 optionally includes image sensor(s) 210. Image sensors(s) 210 optionally include one or more visible light image sensor, such as charged coupled device (CCD) sensors, and/or complementary metal-oxide-semiconductor (CMOS) sensors operable to obtain images of physical objects from the real-world environment. Image sensor(s) 210 also optionally include one or more infrared (IR) sensors, such as a passive or an active IR sensor, for detecting infrared light from the real-world environment. For example, an active IR sensor includes an IR emitter for emitting infrared light into the real-world environment. Image sensor(s) 210 also optionally include one or more cameras configured to capture movement of physical objects in the real-world environment. Image sensor(s) 210 also optionally include one or more depth sensors configured to detect the distance of physical objects from device 200. In some embodiments, information from one or more depth sensors can allow the device to identify and differentiate objects in the real-world environment from other objects in the real-world environment. In some embodiments, one or more depth sensors can allow the device to determine the texture and/or topography of objects in the real-world environment.

In some embodiments, device 200 uses CCD sensors, event cameras, and depth sensors in combination to detect the physical environment around device 200. In some embodiments, image sensor(s) 220 include a first image sensor and a second image sensor. The first image sensor and the second image sensor work in tandem and are optionally configured to capture different information of physical objects in the real-world environment. In some embodiments, the first image sensor is a visible light image sensor and the second image sensor is a depth sensor. In some embodiments, device 200 uses image sensor(s) 210 to detect the position and orientation of device 200 and/or display generation component(s) 224 in the real-world environment. For example, device 200 uses image sensor(s) 210 to track the position and orientation of display generation component(s) 224 relative to one or more fixed objects in the real-world environment.

In some embodiments, device 200 includes microphones(s) 218 or other audio sensors. Device 200 uses microphone(s) 218 to detect sound from the user and/or the real-world environment of the user. In some embodiments, microphone(s) 218 includes an array of microphones (a plurality of microphones) that optionally operate in tandem, such as to identify ambient noise or to locate the source of sound in space of the real-world environment.

Device 200 includes location sensor(s) 214 for detecting a location of device 200 and/or display generation component(s) 224. For example, location sensor(s) 214 can include a GPS receiver that receives data from one or more satellites and allows device 200 to determine the device's absolute position in the physical world.

Device 200 includes orientation sensor(s) 216 for detecting orientation and/or movement of device 200 and/or display generation component(s) 224. For example, device 200 uses orientation sensor(s) 216 to track changes in the position and/or orientation of device 200 and/or display generation component(s) 224, such as with respect to physical objects in the real-world environment. Orientation sensor(s) 216 optionally include one or more gyroscopes and/or one or more accelerometers.

Device 200 includes hand tracking sensor(s) 230 and/or eye tracking sensor(s) 232, in some embodiments. Hand tracking sensor(s) 230 are configured to track the position/location of one or more portions of the user's hands, and/or motions of one or more portions of the user's hands with respect to the extended reality environment, relative to the display generation component(s) 224, and/or relative to another defined coordinate system. Eye tracking senor(s) 232 are configured to track the position and movement of a user's gaze (eyes, face, or head, more generally) with respect to the real-world or extended reality environment and/or relative to the display generation component(s) 224. In some embodiments, hand tracking sensor(s) 230 and/or eye tracking sensor(s) 232 are implemented together with the display generation component(s) 224. In some embodiments, the hand tracking sensor(s) 230 and/or eye tracking sensor(s) 232 are implemented separate from the display generation component(s) 224.

In some embodiments, the hand tracking sensor(s) 230 can use image sensor(s) 210 (e.g., one or more IR cameras, 3D cameras, depth cameras, etc.) that capture three-dimensional information from the real-world including one or more hands (e.g., of a human user). In some examples, the hands can be resolved with sufficient resolution to distinguish fingers and their respective positions. In some embodiments, one or more image sensor(s) 210 are positioned relative to the user to define a field of view of the image sensor(s) and an interaction space in which finger/hand position, orientation and/or movement captured by the image sensors are used as inputs (e.g., to distinguish from a user's resting hand or other hands of other persons in the real-world environment). Tracking the fingers/hands for input (e.g., gestures) can be advantageous in that it does not require the user to touch, hold or wear any sort of beacon, sensor, or other marker.

In some embodiments, eye tracking sensor(s) 232 includes at least one eye tracking camera (e.g., infrared (IR) cameras) and/or illumination sources (e.g., IR light sources, such as LEDs) that emit light towards a user's eyes. The eye tracking cameras may be pointed towards a user's eyes to receive reflected IR light from the light sources directly or indirectly from the eyes. In some embodiments, both eyes are tracked separately by respective eye tracking cameras and illumination sources, and a focus/gaze can be determined from tracking both eyes. In some embodiments, one eye (e.g., a dominant eye) is tracked by a respective eye tracking camera/illumination source(s).

Device 200 is not limited to the components and configuration of FIG. 2, but can include fewer, other, or additional components in multiple configurations. A person using device 200, is optionally referred to herein as a user of the device. Attention is now directed towards examples of user interfaces ("UI") and associated processes that are implemented on an electronic device, such as device 100 and device 200. The UIs can be part of a computer graphics editor that may include a display of a computer graphics editing environment.

Figure 3A:
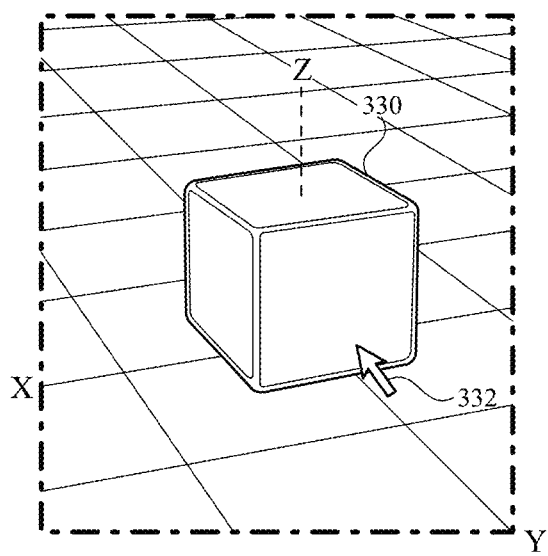
FIG. 3A illustrates an authoring environment graphical user interface (GUI) including a representative virtual object according to examples of the disclosure.

FIG. 3A illustrates an authoring environment GUI including representative virtual object 330 according to some examples of the disclosure. Authoring environment GUI can be displayed on an electronic device (e.g., similar to device 100 or 200) including, but not limited to, portable or non-portable computing devices such as a tablet computing device, laptop computing device or desktop computing device. FIG. 3A illustrates a 3D environment defined by X, Y and Z axes and including virtual object 330 in a first mode of operation (e.g., a scene editing mode). In the example of FIG. 3A, virtual object 330 is a cube, but it should be understood that the cube is merely representative, and that one or more different virtual objects (e.g., one-dimensional (1D), 2D or 3D objects) can be imported or selected from a content library (including a number of shapes, objects, symbols, text, number and the like) and included in the 3D environment.

Additionally, it should be understood that the 3D environment (or 3D virtual object) described herein may be a representation of a 3D environment (or 3D virtual object) displayed in a two dimensional (2D) context (e.g., displayed on a 2D screen). In some examples, the 3D environment can display gridlines or other indicators to assist a content creator with placement and/or size of a virtual object in the 3D environment. In the example of FIG. 3A, position indicator 332 is shown over virtual object 330. Position indicator 332 is intended to be merely symbolic, and can represent a displayed cursor or other current location indicator, or merely the presence of a finger or stylus touching or hovering over virtual object 330 without any visible indicator being displayed. Selection of virtual object 330 as represented by position indicator 332, such as a finger/stylus touch or tap over the virtual object, or a mouse click, can select the virtual object for editing and cause an object manipulator to appear.

Figure 3B:
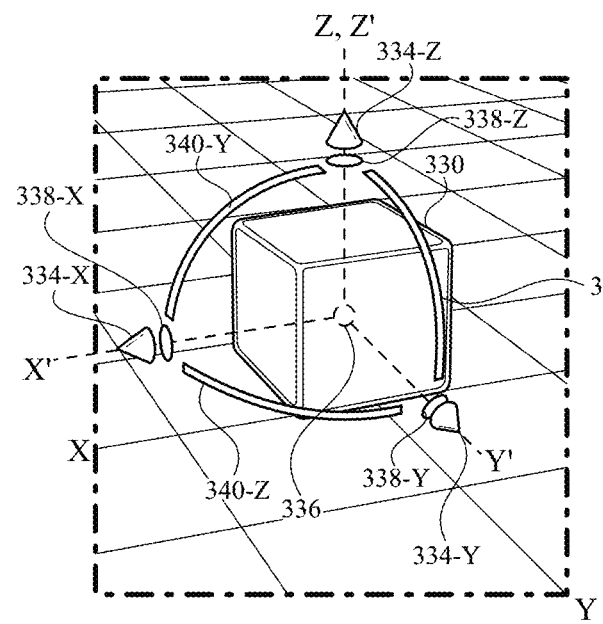
FIG. 3B illustrates a selected virtual object and its associated object manipulator according to examples of the disclosure.

FIG. 3B illustrates selected virtual object 330 and its associated object manipulator according to examples of the disclosure. When virtual object 330 is selected as described above, an object manipulator can appear over the virtual object to enable transformations of the virtual object. In the example of FIG. 3B, the object manipulator is shown in a default state, which can include cone-shaped single-axis translation affordances 334-X, 334-Y and 334-Z oriented in the X, Y and Z directions (i.e., parallel to the X, Y and Z axes) along the X', Y' and Z' object axes, respectively, wherein the object axes have an origin at center of object indicator 336. In some examples, the single-axis translation affordances can be displayed with unique colors associated with each of the X, Y and Z axes. The object manipulator can also include disc-shaped scale affordances 338-X, 338-Y and 338-Z located "behind" single-axis translation affordances 334-X, 334-Y and 334-Z, respectively (i.e., between the single-axis translation affordances and center of object indicator 336), and aligned on the same object axes as the single-axis translation affordances. The object manipulator can also include arc-shaped rotation affordances 340-X, 340-Y and 340-Z for rotation about the object axes X', Y' and Z', respectively. Each arc-shaped rotation affordance can be displayed in a different plane defined by the plurality of object axes. In some examples, the arc-shaped rotation affordances can be displayed with unique colors associated with each of the X, Y and Z axes. In the example of FIG. 3B, rotation affordance 340-X is within the X=0 plane, rotation affordance 340-Y is within the Y=0 plane, and rotation affordance 340-Z is within a non-zero Z plane (i.e., all planes intersecting with center of object indicator 336. For purposes of defining a view of the virtual object, the 3D environment of FIG. 3B (and other 3D environments referred to throughout this disclosure) can be divided into eight regions, or octants, in 3D space as defined by the object axes, with a relative origin at center of object indicator 336. In some examples of the disclosure, the affordances of the object manipulator can appear within the viewing octant, as shown in FIG. 3B, such that the affordances are always displayed in front of the virtual object for unobstructed views and easy access.

In some examples, the object manipulator can be maintained at a default size, even while the 3D environment and any virtual objects in the environment are zoomed in or out. Maintaining the object manipulator at a default size can enable the object manipulator to maintain its ease of use, even when virtual objects are very small. However, in other examples, the object manipulator can grow or shrink as the 3D environment is zoomed out or in. In some examples, the appearance (e.g., color, thickness, shading, shape, location) of one or more of center of object indicator 336, single-axis translation affordances 334-X, 334-Y and 334-Z, disc-shaped scale affordances 338-X, 338-Y and 338-Z, and arc-shaped rotation affordances 340-X, 340-Y and 340-Z can be changed in an object manipulator properties pane that may appear as an overlay in the 3D environment or may be displayed in a window outside the 3D environment.

Figure 3C:
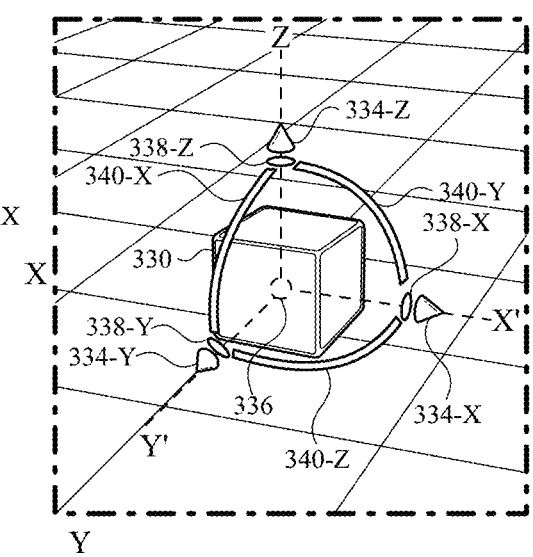
FIG. 3C illustrates a selected virtual object being viewed from a different perspective as compared to FIG. 3B and having a reoriented object manipulator according to examples of the disclosure.

FIG. 3C illustrates selected virtual object 330 being viewed from a different perspective as compared to FIG. 3B and having a reoriented object manipulator according to examples of the disclosure. FIG. 3B represents a viewing perspective of a particular octant in 3D space. In other words, FIG. 3B displays what a user would see, if the user was looking at virtual object 330 from a particular octant in 3D space as defined by the object axes. In the example of FIG. 3C, the viewing perspective has been changed to a different octant as compared to FIG. 3B (as evidenced by the changed positions of the X and Y axes). In FIG. 3C, single-axis translation affordance 334-X and scale affordance 338-X have reversed their directions in the X-direction, and rotation affordances 340-Y and 340-Z have also been relocated as compared to FIG. 3B. In some examples, the re-orientation of the object manipulator can change automatically as the user's viewpoint switches to different octants in 3D space. In some examples, the object manipulator can snap to a new, discrete orientation (e.g., from the orientation of FIG. 3B to the orientation of FIG. 3C) as soon as the viewpoint switches to a different octant, but in other examples, the object manipulator can animatedly move and gradually change orientation. For example, rotation affordance 340-Z can gradually and continuously rotate from the orientation of FIG. 3B to the orientation of FIG. 3C as the 3D environment rotates clockwise about the Z axis (i.e., looking "down" in FIGS. 3B and 3C). In some examples, the selection of the type of re-orientation of the object manipulator (e.g., snap or continuous) can be set in an object manipulator properties pane that may appear as an overlay in the 3D environment or may be displayed in a window outside the 3D environment. This re-orientation can provide the advantage of always displaying the object manipulator in the foreground of the virtual object being manipulated, such that all components of the object manipulator always remain visible and accessible as the viewpoint of the 3D environment changes. This improved accessibility to the object manipulator can provide for easier and more accurate object manipulation.

Figure 4A:
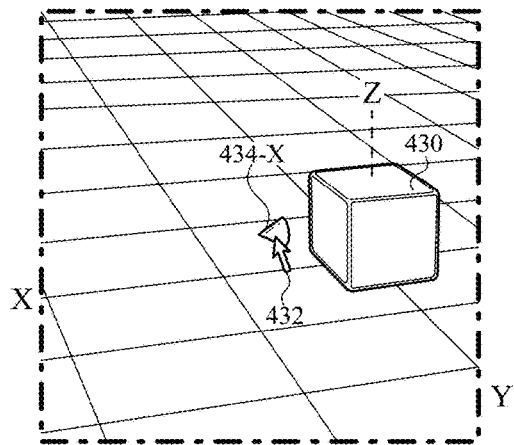
FIG. 4A illustrates the selection of a single-axis translation affordance for a virtual object according to examples of the disclosure.

FIG. 4A illustrates the selection of single-axis translation affordance 434-X for virtual object 430 according to examples of the disclosure. When an object manipulator is displayed (as shown in the example of FIG. 3B), selection of translation affordance 434-X as indicated by position indicator 432 (e.g., by moving a cursor over the affordance and clicking and holding a mouse button, by a persistent touch on the translation affordance, etc.) can cause the selected translation affordance to remain displayed while some or all other components of the object manipulator disappear, as shown in the example of FIG. 4A. Although FIG. 4A shows the selection of X-direction translation affordance 434-X for purposes of illustration only, it should be understood that in other alternative examples the Y-direction translation affordance or the Z-direction translation affordance (see, e.g., translation affordances 334-Y or 334-Z in FIG. 3B) may alternatively be selected.

Figure 4B:
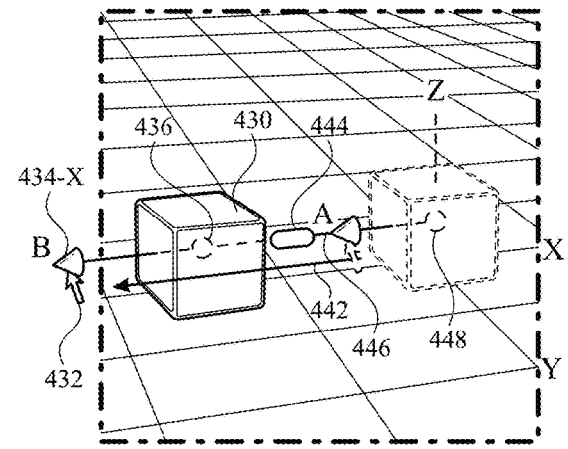
FIG. 4B illustrates a single-axis translation of a virtual object using a single-axis translation affordance according to examples of the disclosure.

FIG. 4B illustrates a single-axis translation of virtual object 430 using single-axis translation affordance 434-X according to examples of the disclosure. In the example of FIG. 4B (which is a continuation of the example of FIG. 4A), selected translation affordance 434-X is dragged (e.g., by clicking and holding a mouse button and moving the mouse, by sliding a touching finger, etc.) by a particular amount in the +X direction along its associated object axis from location A to location B, as indicated by arrow 442. While dragging affordance 434-X, virtual object 430 and center of object indicator 436 can translate along with the affordance in the same direction. In some examples, center of object indicator 436 can be displayed in a different manner (e.g., different color, shape, shading, opacity, etc.) from the original center of object location 448. During the translation, line 446 can be displayed, extending from the original center of object location 448 to affordance 434-X. In some examples, line 446 can be displayed with a visual gradient, such as with darker shading near affordance 434-X and lighter shading near the original center of object location 448, or the reverse. In some examples, the appearance (e.g., color, thickness, shading, shape, location) of one or more of center of object indicator 436, original center of object location 448, and line 446 can be changed in an object manipulator properties pane that may appear as an overlay in the 3D environment or may be displayed in a window outside the 3D environment. Although FIG. 4B shows the translation of virtual object 430 in the X-direction for purposes of illustration only, it should be understood that in other alternative examples the Y-direction translation affordance or the Z-direction translation affordance (see, e.g., translation affordances 334-Y or 334-Z in FIG. 3B) may alternatively be selected and used to translate the virtual object in the Y-direction or Z-direction, respectively.

While dragging affordance 434-X by a particular amount in the +X direction, virtual object 430 can translate along with the affordance by the same amount (i.e., in a linear relationship) in the +X direction from its original location (indicated by dashed lines) to a new location (indicated by solid lines). In other examples, the translation of affordance 434-X and virtual object 430 can occur in a proportional relationship. In one specific example, the translation of affordance 434-X and virtual object 430 can occur in a 1:2 ratio, such that the virtual object will translate twice as much as the affordance. This type of translation ratio can be advantageous when moving virtual objects large distances. In another specific example, the translation of affordance 434-X and virtual object 430 can occur in a 5:1 ratio, such that the virtual object will translate only one-fifth as much as the affordance. This can be advantageous when fine distance control is required in moving virtual objects small distances. Note that the aforementioned ratios are for purposes of illustration only, and that other ratios are contemplated. In some examples, the translation ratios of the single-axis translation affordances can be changed in an object manipulator properties pane that may appear as an overlay in the 3D environment or may be displayed in a window outside the 3D environment.

In some examples, pill 444 can appear halfway (or with some other ratio) between affordance 434-X and the original center of object location 448. Pill 444 can indicate the amount virtual object 430 has moved and/or the amount affordance 434-X has moved, which can be advantageous when a specific amount of movement of the virtual object and/or affordance is required. In some examples, line 446 and pill 444 can have a different appearance (e.g., solid, dashed, dotted, outlined, wire-framed, or different shading) depending on whether they are in front of, behind, or within the previous or current volume of virtual object 430. Although FIGS. 4A and 4B illustrate an example translation in the +X direction, in other examples the translation can be performed in the −X direction. In some examples, the location and appearance of pill 444, including the information it provides, and line 446 can be changed in an object manipulator properties pane that may appear as an overlay in the 3D environment or may be displayed in a window outside the 3D environment.

Figure 5A:
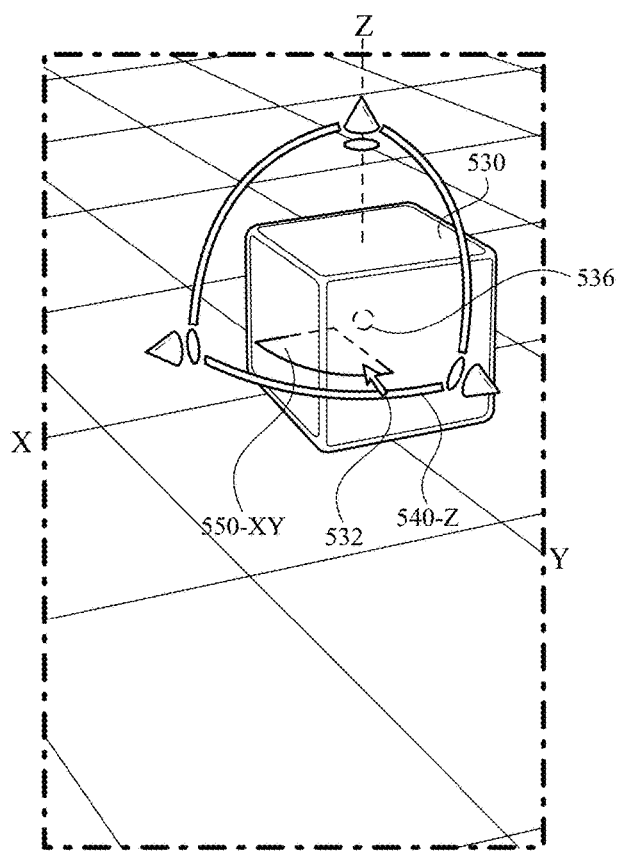
FIG. 5A illustrates the appearance and selection of a two-axis translation affordance for a virtual object according to examples of the disclosure.

FIG. 5A illustrates the appearance and selection of two-axis translation affordance 550-XY for virtual object 530 according to examples of the disclosure. When an object manipulator is displayed (as shown in the example of FIG. 3B), hovering over an area in the plane defined by rotation affordance 540-Z in FIG. 5A and within the arc of that rotation affordance as indicated by position indicator 532 (e.g., by moving a finger or cursor over the area, etc.) can cause a slice-shaped two-axis translation affordance 550-XY to appear. Selection of two-axis translation affordance 550-XY (e.g., by clicking and holding a mouse button, a persistent touch over the area, etc.) can cause some or all other components of the object manipulator to disappear. In some examples, slice-shaped two-axis translation affordance 550-XY can be shaded or otherwise appear different from surrounding areas in the 3D environment. In one example, each slice-shaped two-axis translation affordance can be displayed with the same color as the adjacent rotation affordance on the same plane. In some examples, the appearance (e.g., color, thickness, shading, shape, location) of two-axis translation affordance 550-XY can be changed in an object manipulator properties pane that may appear as an overlay in the 3D environment or may be displayed in a window outside the 3D environment. Although FIG. 5A shows the selection of two-axis translation affordance 550-XY for purposes of illustration only, it should be understood that in other alternative examples a two-axis YZ-direction translation affordance or a two-axis XZ-direction translation affordance may alternatively be selected.

Figure 5B:
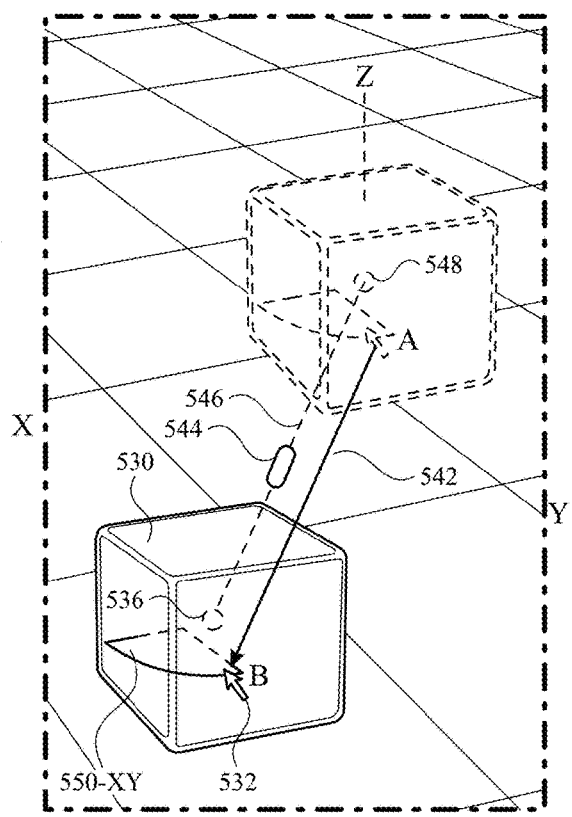
FIG. 5B illustrates a two-axis translation of a virtual object using a two-axis translation affordance according to examples of the disclosure.

FIG. 5B illustrates a two-axis translation of virtual object 530 using two-axis translation affordance 550-XY according to examples of the disclosure. In the example of FIG. 5B (which is a continuation of the example of FIG. 5A), two-axis translation affordance 550-XY has been selected as described above with respect to FIG. 5A, and therefore two-axis translation affordance 550-XY appears at location A, while all other components of the object manipulator have disappeared. Two-axis translation affordance 550-XY is dragged (e.g., by clicking and holding a mouse button and moving the mouse, by sliding a touching finger, etc.) by a particular amount in the XY direction (a two-dimensional translation) from location A to location B, as indicated by arrow 542. While dragging affordance 550-XY, virtual object 530 and center of object indicator 536 can translate along with the affordance in the same direction. In some examples, center of object indicator 536 can be displayed in a different manner (e.g., different color, shape, shading, opacity, etc.) from the original center of object location 548. During the translation, line 546 can be displayed, extending from the original center of object location 548 to the current center of object indicator 536. In some examples, line 546 can be displayed with a visual gradient, such as with darker shading near the center of object indicator and lighter shading near the original center of object location 548, or the reverse. In some examples, the appearance of center of object indicator 536, original center of object location 548, and line 546 can be changed in an object manipulator properties pane that may appear as an overlay in the 3D environment or may be displayed in a window outside the 3D environment. Although FIG. 5B shows the translation of virtual object 530 in the +X+Y-direction for purposes of illustration only, it should be understood that in other alternative examples the YZ-direction translation affordance or the XZ-direction translation affordance may alternatively be selected and used to translate the virtual object in the YZ-direction or XZ-direction (negative or positive), respectively.

In the example of FIG. 5B, while dragging affordance 550-XY by a particular amount in the +X+Y direction, virtual object 530 can translate along with the affordance by the same amount (i.e., in a linear relationship) in the +X+Y direction from its original location (indicated by dashed lines) to a new location (indicated by solid lines). In other examples, translation of affordance 550-XY and virtual object 530 can occur in a proportional relationship (i.e., a different translation amount). In one specific example, translation of affordance 550-XY and virtual object 530 can occur in a 1:2 ratio, such that the virtual object will translate twice as much in each of the X and Y directions as the affordance. This type of translation ratio can be advantageous when moving virtual objects large distances. In another specific example, translation of affordance 550-XY and virtual object 530 can occur in a 5:1 ratio, such that the virtual object will translate only one-fifth as much in the X and Y directions as the affordance. This can be advantageous when fine distance control is required in moving virtual objects small distances. Note that the aforementioned ratios are for purposes of illustration only, and that other ratios are contemplated. In some examples, the translation ratios of the two-axis translation affordances can be changed in an object manipulator properties pane that may appear as an overlay in the 3D environment or may be displayed in a window outside the 3D environment.

In some examples, pill 544 can appear halfway (or with some other ratio) between the center of object indicator 536 and the original center of object location 548. Pill 544 can indicate the amount (e.g., ΔX, ΔY) virtual object 530 has moved and/or the amount affordance 550-XY has moved, which can be advantageous when a specific amount of movement of the virtual object and/or affordance is required. In some examples, line 546 and pill 544 can have a different appearance (e.g., solid, dashed, dotted, outlined, wire-framed, or different shading) depending on whether they are in front of, behind, or within the previous or current volume of virtual object 530. Although FIGS. 5A and 5B illustrate an example two-axis translation affordance 550-XY and object translation in the +X+Y direction, in other examples the translation can be performed in other XY directions (e.g., XY translation affordances in other quadrants can be selected, displayed and used to perform translations in other XY directions (e.g., in the −X+Y direction, the +X −Y direction, or the −X −Y direction)). In addition, in other examples different two-axis translation affordances can be selected, displayed and used to perform other two-axis translations (e.g., in the XZ or YZ directions). In some examples, the location and appearance of pill 544, including the information it provides, and line 546 can be changed in an object manipulator properties pane that may appear as an overlay in the 3D environment or may be displayed in a window outside the 3D environment.

FIG. 6A illustrates the selection of single-axis scale affordance 638-X for virtual object 630 according to examples of the disclosure. When an object manipulator is displayed (as shown in the example of FIG. 3B), selection of scale affordance 638-X as indicated by position indicator 632 (e.g., by moving a cursor over the affordance and clicking and holding a mouse button, by a persistent touch on the scale affordance, etc.) can cause the selected scale affordance to remain displayed while some or all other components of the object manipulator disappear, as shown in the example of FIG. 6A. Although FIG. 6A shows the selection of X-direction scale affordance 638-X for purposes of illustration only, it should be understood that in other alternative examples the Y-direction scale affordance or the Z-direction scale affordance (see, e.g., translation affordances 338-Y or 338-Z in FIG. 3B) may alternatively be selected.

In some examples, single-axis scale affordance 638-X can scale uniformly, while in other examples, the scale affordance can scale nonuniformly. For example, to select nonuniform scaling, a further input (e.g., pressing an option key) can be generated while selecting a particular scale affordance, whereas uniform scaling is selected if no further input is generated while selecting the particular scale affordance. In some examples, the scale affordances can take on a different appearance depending on whether they are configured for uniform or nonuniform scaling. For example, all scale affordances can be the same color (e.g., grey) when they are configured for uniform scaling, while each scale affordance can have the color assigned to a particular dimension when they are configured for nonuniform scaling.

FIG. 6B illustrates the uniform scaling of virtual object 630 using scale affordance 638-X according to examples of the disclosure. In the example of FIG. 6B (which is a continuation of the example of FIG. 6A), scale affordance 638-X has been selected for uniform scaling (e.g., selected without receiving a further input to invoke nonuniform scaling) and is dragged (e.g., by clicking and holding a mouse button and moving the mouse, by sliding a touching finger, etc.) a certain amount in an increasing X direction along its associated object axis from location A to location B, as indicated by arrow 642. While dragging affordance 638-X in the increasing X direction along its associated object axis, virtual object 630 can scale outwardly and uniformly in all directions (i.e., virtual object 630 expands outwardly from center of object indicator 636) from its original volume (indicated by dashed lines) to a new volume (indicated by solid lines) as shown in FIG. 6B. However, it should be understood that affordance 638-X can also be dragged in a decreasing X direction (i.e., from point A towards center of object location 636) along its object axis to scale virtual object 630 inwardly and uniformly in all directions such that is becomes smaller than its original size (i.e., the virtual object shrinks inwardly towards the center of object indicator). During scaling, line 646 can be displayed, extending from the center of object indicator 636 to affordance 638-X. In some examples, line 646 can be displayed with a visual gradient, such as with darker shading near affordance 638-X and lighter shading near center of object indicator 636, or the reverse. In some examples, the appearance (e.g., color, thickness, shading, shape, location) of one or more of center of object indicator 636 and line 646 can be changed in an object manipulator properties pane that may appear as an overlay in the 3D environment or may be displayed in a window outside the 3D environment.

While dragging affordance 638-X in the X direction along its associated object axis by a particular amount, virtual object 630 can scale uniformly by the same amount (i.e., in a linear relationship) in the X, Y and Z directions. In other examples, the dragging of affordance 638-X and the uniform scaling of virtual object 630 can occur in a proportional relationship. In one specific example for purposes of illustration only, the dragging of affordance 638-X in the increasing X direction along its associated object axis and the uniform scaling of virtual object 630 can occur in a 1:2 ratio, such that the virtual object will scale uniformly and outwardly in all directions twice as much as the affordance is dragged in the increasing X direction along its associated object axis. This can be advantageous when uniformly scaling virtual objects by large amounts. In another example for purposes of illustration only, the dragging of affordance 638-X in the increasing X direction along its associated object axis and the uniform scaling of virtual object 630 can occur in a 5:1 ratio, such that the virtual object will scale uniformly and outwardly in the X, Y and Z directions only one-fifth as much as the affordance is dragged in the increasing X direction along its associated object axis. This can be advantageous when fine scaling control is required to uniformly scale virtual objects by small amounts. In some examples, the scaling ratios and appearance of the single-axis scale affordances can be changed in an object manipulator properties pane that may appear as an overlay in the 3D environment or may be displayed in a window outside the 3D environment.

In some examples, pill 644 can appear halfway (or with some other ratio) between affordance 638-X and center of object indicator 636. Pill 644 can indicate the amount virtual object 630 has uniformly scaled (e.g., $\Delta X$, $\Delta Y$, $\Delta Z$, a percentage dimensional increase/decrease, a percentage volume increase/decrease, etc.) and/or the amount affordance 638-X has been dragged (e.g., $\Delta X$, a percentage dimensional increase/decrease, etc.), which can be advantageous when a specific amount or percentage of uniform scaling of the virtual object is required. In some examples, line 646 and pill 644 can have a different appearance (e.g., solid, dashed, dotted, outlined, wire-framed, or different shading) depending on whether they are outside or within the previous or current volume of virtual object 630. In some examples, the location and appearance of pill 644, including the information it provides, and the appearance of line 646 can be changed in an object manipulator properties pane that may appear as an overlay in the 3D environment or may be displayed in a window outside the 3D environment. Although FIG. 6A illustrates the uniform scaling of virtual object 630 using scale affordance 638-X for purposes of illustration only, it should be understood that in other alternative examples, the Y-direction scale affordance or the Z-direction scale affordance (see, e.g., scale affordances 338-Y or 338-Z in FIG. 3B) may alternatively be selected and used to uniformly scale the virtual object as described above.

FIG. 6C illustrates the nonuniform scaling of virtual object 630 using scale affordance 638-X according to examples of the disclosure. In the example of FIG. 6C (which is a continuation of the example of FIG. 6A), scale affordance 638-X has been selected for nonuniform scaling (e.g., selected while receiving a further input to invoke nonuniform scaling) and is dragged (e.g., by clicking and holding a mouse button and moving the mouse, by sliding a touching finger, etc.) by a certain amount in an increasing +X direction along its associated object axis from location A to location B, as indicated by arrow 642. While dragging affordance 638-X in the increasing +X direction along its associated object axis, virtual object 630 can scale nonuniformly in only the increasing +X direction, as shown in FIG. 6C. In other words, the size of virtual object 630 is maintained (left unchanged) in the Y and Z directions, and also in the −X direction. However, in other examples, virtual object 630 can scale uniformly in both the increasing and decreasing X directions (the decreasing X direction indicated by arrow 664) but nonuniformly with respect to the Y and Z directions (i.e., no scaling occurs in the Y and Z directions). However, it should be understood that affordance 638-X can also be dragged in a decreasing X direction (i.e., from point A towards original center of object location 648) to scale virtual object 630 nonuniformly in the X direction such that is becomes smaller than its original size in the X dimension (i.e., the virtual object shrinks inwardly in the X dimension towards the center of object indicator). During scaling, line 646 can be displayed, extending from the original center of object location 648 to affordance 638-X. In some examples, line 646 can be displayed with a visual gradient, such as with darker shading near affordance 638-X and lighter shading near the original center of object location 648, or the reverse. In some examples, the appearance (e.g., color, thickness, shading, shape, location) of one or more of original center of object location 648 and line 646 can be changed in an object manipulator properties pane that may appear as an overlay in the 3D environment or may be displayed in a window outside the 3D environment.

While dragging affordance 638-X in the X direction by a particular amount, virtual object 630 can scale nonuniformly by the same amount (i.e., in a linear relationship) in only the X direction. In other examples, the dragging of affordance 638-X and the nonuniform scaling of virtual object 630 can occur in a proportional (but not linear) relationship. In one specific example for purposes of illustration only, the dragging of affordance 638-X in the increasing X direction and the nonuniform scaling of virtual object 630 can occur in a 1:2 ratio, such that the virtual object will scale nonuniformly in only the increasing X dimension twice as much as the affordance is dragged in the increasing X dimension. This can be advantageous when nonuniformly scaling virtual objects by large amounts. In another example for purposes of illustration only, the dragging of affordance 638-X in the increasing X direction and the nonuniform scaling of virtual object 630 can occur in a 5:1 ratio, such that the virtual object will scale nonuniformly in only the increasing X dimension only one-fifth as much as the affordance is dragged in the increasing X direction. This can be advantageous when fine scaling control is required to nonuniformly scale virtual objects by small amounts.

In some examples, pill 644 can appear halfway (or with some other ratio) between affordance 638-X and the original center of object location 648. Pill 644 can indicate the amount virtual object 630 has nonuniformly scaled (e.g., ΔX, a percentage dimensional increase, a percentage volume increase, etc.) and/or the amount affordance 638-X has been dragged (e.g., ΔX, a percentage dimensional increase, etc.), which can be advantageous when a specific amount or percentage of nonuniform scaling of the virtual object is required. In some examples, line 646 and pill 644 can have a different appearance depending on whether they are outside or within the previous or current volume of virtual object 630. In some examples, the location and appearance of pill 644, including the information it provides, and the appearance of line 646 can be changed in an object manipulator properties pane that may appear as an overlay in the 3D environment or may be displayed in a window outside the 3D environment. Although FIG. 6C illustrates the nonuniform scaling of virtual object 630 using scale affordance 638-X for purposes of illustration only, it should be understood that in other alternative examples, the Y-direction scale affordance or the Z-direction scale affordance (see, e.g., scale affordances 338-Y or 338-Z in FIG. 3B) may alternatively be selected and used to nonuniformly scale the virtual object as described above.

Figure 7A:
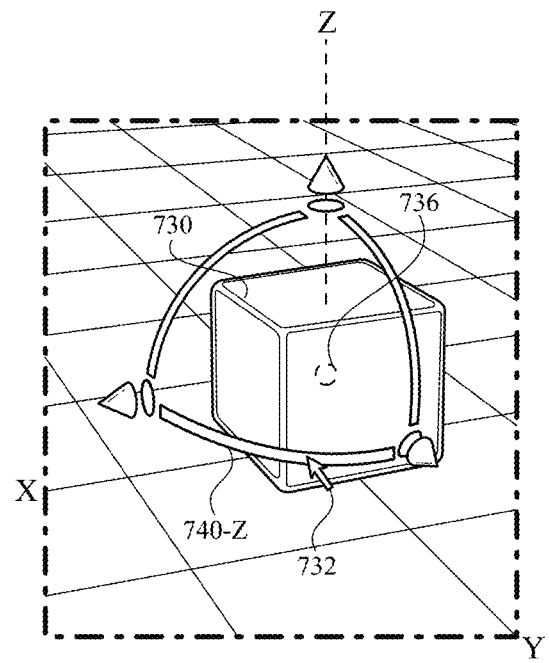
FIG. 7A illustrates the highlighting and selection of a rotation affordance for a virtual object according to examples of the disclosure.

FIG. 7A illustrates the highlighting and selection of rotation affordance 740-Z for virtual object 730 according to examples of the disclosure. When an object manipulator is displayed (as shown in the example of FIG. 3B), the highlighting of rotation affordance 740-Z in FIG. 7A as indicated by position indicator 732 (e.g., by hovering over the area, by moving a cursor over the area, etc.) can cause rotation affordance 740-Z to thicken and/or brighten to make selection and subsequent manipulation easier. Rotation affordance 740-Z can then be selected (e.g., by clicking a mouse button, tapping, releasing a persistent touch, applying additional force to a persistent touch, etc.). Although the example of FIG. 7A only illustrates rotation affordance 740-Z being selected, in other examples either of the other two rotation affordances can also be highlighted, thickened in appearance, and selected.

Figure 7B:
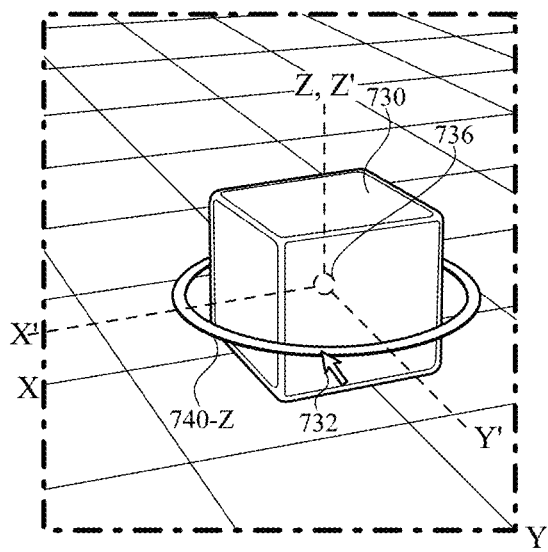
FIG. 7B illustrates the selection of a rotation affordance of a virtual object according to example of the disclosure.

FIG. 7B illustrates the selection of rotation affordance 740-Z of virtual object 730 according to example of the disclosure. In the example of FIG. 7B (which is a continuation of the example of FIG. 7A), when rotation affordance 740-Z is selected, some or all other components of the object manipulator can disappear, and the arc-shaped rotation affordance of FIG. 7A can transform to a full ring rotation affordance. In some examples, full ring rotation affordance 740-Z can be displayed with the color associated with the Z axis. In some examples, full ring rotation affordance 740-Z can be maintained at a default size, even while the 3D environment and any virtual objects in the environment are zoomed in or out. Maintaining full ring rotation affordance 740-Z at a default size can enable the rotation affordance to maintain its ease of use, even when virtual objects are very small. However, in other examples, full ring rotation affordance 740-Z can grow or shrink as the 3D environment is zoomed out or in. Rotating (e.g., by dragging) the selected full ring rotation affordance 740-Z can cause virtual object 730 to rotate about virtual object axis Z' that is parallel to (and in the example of FIG. 7B, overlapping with) the Z-axis of the 3D coordinate system of the environment. Although the example of FIG. 7B only illustrates full ring rotation affordance 740-Z being displayed after selection, in other examples a different full ring rotation affordance such as a full ring X-axis rotation affordance or a full ring Y-axis rotation affordance can be displayed after selection, and dragged to rotate the virtual object about different virtual object axes (e.g., X' or Y').

Figure 7C:
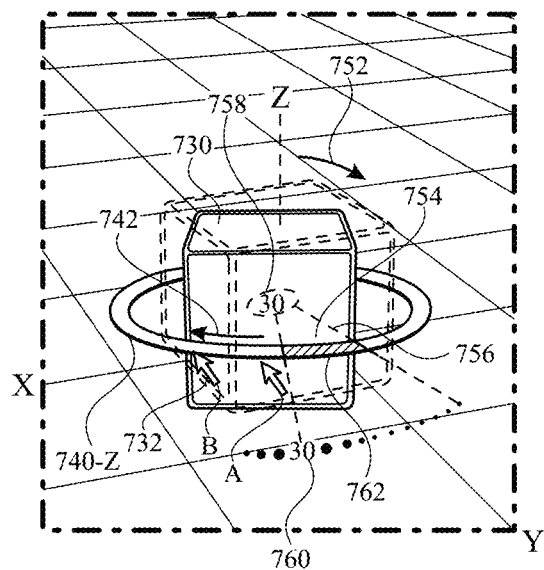
FIG. 7C illustrates the rotation of a virtual object using a rotation affordance according to examples of the disclosure.

FIG. 7C illustrates the rotation of virtual object 730 using rotation affordance 740-Z according to examples of the disclosure. In the example of FIG. 7C (which is a continuation of FIG. 7B), dragging along selected rotation affordance 740-Z from point A to point B (as indicated by arrow 742) using position indicator 732, causes virtual object 730 to rotate about its virtual object axis, as indicated by arrow 752. In some examples, as rotation affordance 740-Z is rotated, a slice-shaped area 754 can appear, which may be bounded by lines 756 and shaded or otherwise appear different from surrounding areas in the 3D environment, to provide a visual indicator of the amount of rotation. In some examples, a portion 762 of rotation affordance 740-Z can be shaded, darkened, or otherwise appear different from the remainder of the affordance to provide a visual indication of the amount of rotation. In some examples, pill 758 can appear at the center of virtual object 730 and indicate a rotation amount (e.g. number degrees). In some examples, arc 760 can appear outside rotation affordance 740-Z and can include dots, hash or tic marks and optionally the amount of rotation. Pill 758 and/or arc 760 can advantageously provide an indication of a precise amount of rotation, which can be useful when a particular amount of rotation is desired.

Figure 8A:
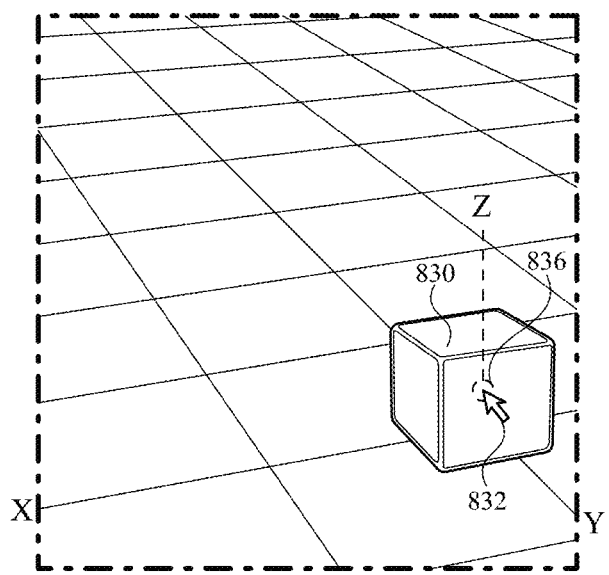
FIG. 8A illustrates the selection of a center of object affordance for a virtual object according to examples of the disclosure.

FIG. 8A illustrates the selection of center of object indicator (affordance) 836 for virtual object 830 according to examples of the disclosure. When an object manipulator is displayed (as shown in the example of FIG. 3B), selection of center of object affordance 836 as indicated by position indicator 832 (e.g., by moving a cursor over the affordance and clicking and holding a mouse button, by a persistent touch on the translation affordance, etc.) can cause the selected center of object affordance to remain displayed while some or all other components of the object manipulator disappear, as shown in the example of FIG. 8A.

Figure 8B:
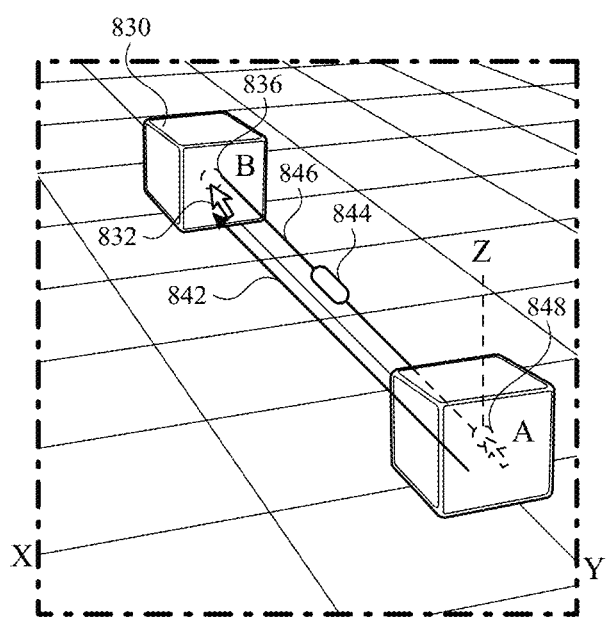
FIG. 8B illustrates an omnidirectional translation (i.e., a screen space move) of a virtual object using a center of object affordance according to examples of the disclosure.

FIG. 8B illustrates an omnidirectional translation (i.e., a screen space move) of virtual object 830 using center of object affordance 836 according to examples of the disclosure. In the example of FIG. 8B (which is a continuation of the example of FIG. 8A), selected center of object affordance 836 is dragged by a certain ΔXΔYΔZ amount from location A to location B, as indicated by arrow 842. While dragging center of object affordance 836, virtual object 830 can translate along with the affordance by the same ΔXΔYΔZ amounts (i.e., in a linear relationship) from its original location (indicated by dashed lines) to a new location (indicated by solid lines). In some examples, center of object affordance 836 can be displayed in a different manner (e.g., different color, shape, shading, opacity, etc.) from the original center of object location 848. During the translation, line 846 can be displayed, extending from the original center of object location 848 to center of object affordance 836. In some examples, line 846 can be displayed with a visual gradient, such as with darker shading near center of object affordance 836 and lighter shading near the original center of object location 848, or the reverse. In some examples, the appearance of center of object affordance 836, line 846, and original center of object location 848 can be changed in an object manipulator properties pane that may appear as an overlay in the 3D environment or may be displayed in a window outside the 3D environment.

In some examples, pill 844 can appear halfway (or with some other ratio) between center of object affordance 836 and the original center of object location 848. Pill 844 can indicate the amount virtual object 830 has moved, which can be advantageous when a specific amount of movement of the virtual object is required. In some examples, line 846 and pill 844 can have a different appearance (e.g., solid, dashed, dotted, outlined, wire-framed, or different shading) depending on whether they are in front of, behind, or within the previous or current volume of virtual object 830. In some examples, the location and appearance of pill 844 and the information it displays can be changed in an object manipulator properties pane that may appear as an overlay in the 3D environment or may be displayed in a window outside the 3D environment.

Figure 9:
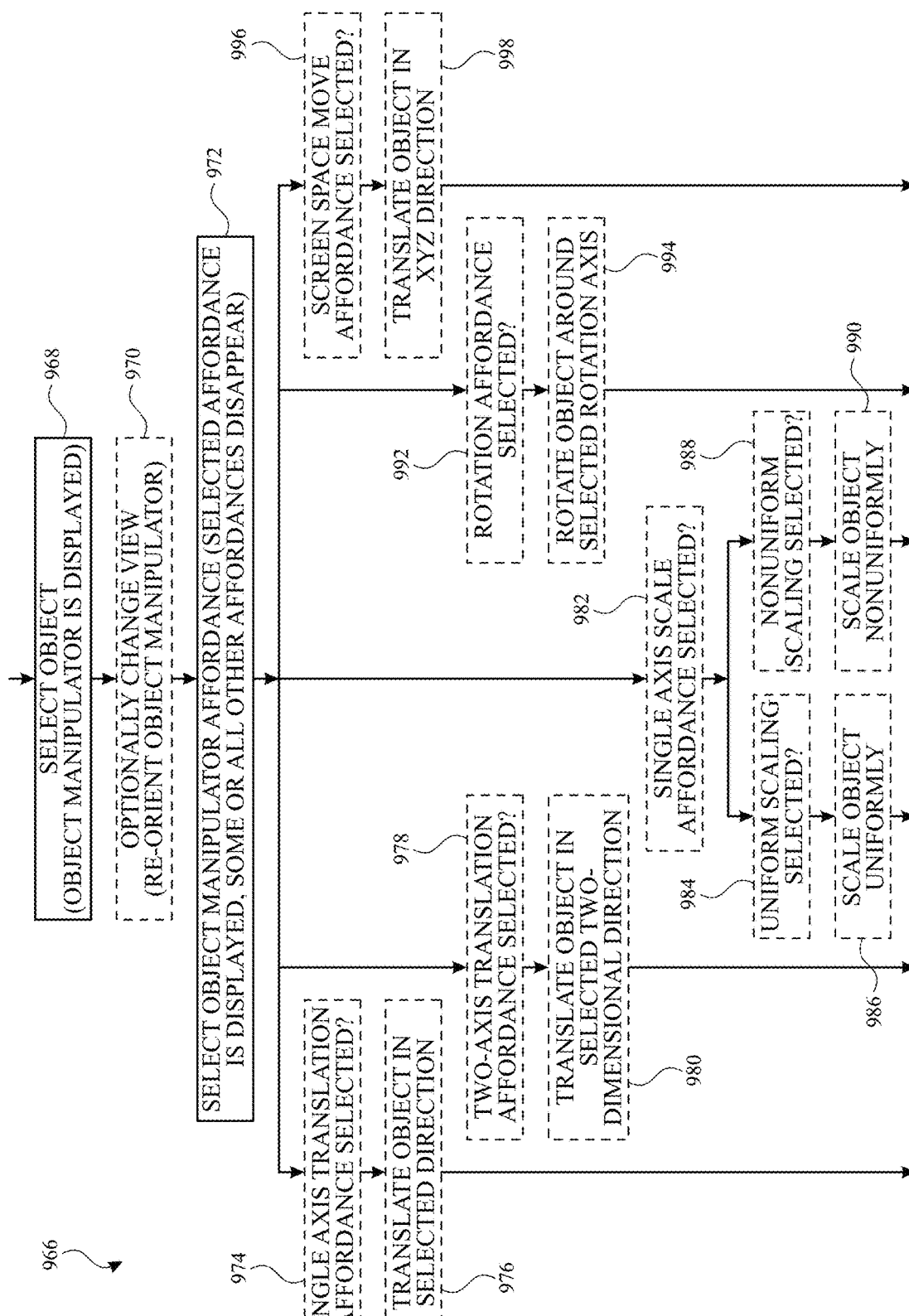
FIG. 9 illustrates a flow diagram illustrating a process for virtual object manipulation according to examples of the disclosure.

FIG. 9 illustrates a flow diagram illustrating a process 966 for virtual object manipulation according to examples of the disclosure. Process 966 begins with the selection of a virtual object in the 3D environment at 968, which causes an object manipulator to be displayed. In some examples, the view of the virtual object can be changed at 970, which can cause a reorientation of the object manipulator. A particular object manipulator affordance can be selected at 972, which can cause some or all other object manipulator affordances to disappear.

If a single axis translation affordance is selected at 974, the virtual object can be translated in the direction associated with the selected single axis translation affordance at 976. If a two axis translation affordance is selected at 978, the virtual object can be translated in the direction dictated by dragging the affordance at 980. If a single axis scale affordance is selected at 982, and uniform scaling is selected at 984, the virtual object can be scaled uniformly in all dimensions at 986. If nonuniform scaling is selected at 988, the virtual object can be scaled nonuniformly in the direction associated with the selected scale affordance at 990. If a rotation affordance is selected at 992, the virtual object can be rotated about the axis associated with the selected rotation affordance at 994. If a screen space move affordance is selected at 996, the virtual object can be moved in the direction dictated by dragging the affordance at 998.

It is understood that process 966 is an example and that more, fewer, or different operations can be performed in the same or in a different order. Additionally, the operations in process 966 described above are, optionally, implemented by running one or more functional modules in an information processing apparatus such as general-purpose processors (e.g., as described with respect to FIG. 2) or application specific chips, and/or by other components of FIG. 2.

Therefore, according to the above, some examples of the disclosure are directed to a method comprising, at an electronic device in communication with a display and one or more input devices, presenting, using the display, a graphical environment including a virtual object having a plurality of object axes, while presenting the virtual object, receiving input representing selection of the virtual object, after receiving the input representing selection of the virtual object, presenting an object manipulator along with the virtual object, the object manipulator having a plurality of affordances including a plurality of rotation affordances for rotating the virtual object, each rotation affordance for rotating the virtual object about a different object axis, while presenting the object manipulator, receiving input representing selection of a particular rotation affordance, after receiving the input representing selection of the particular rotation affordance, enlarging the selected particular rotation affordance to a ring, and ceasing display of the other rotation affordances, while presenting the selected ring rotation affordance, receiving input representing rotation of the selected ring rotation affordance, and after receiving the input representing rotation of the selected ring rotation affordance, rotating the selected virtual object about the object axis associated with the selected ring rotation affordance. Additionally or alternatively to one or more of the examples presented above, in some examples the method further comprises presenting the graphical environment from a viewing perspective of a particular octant in 3D space, and relocating one or more affordances of the object manipulator as the viewing perspective changes such that the displayed affordances of the object manipulator are in the octant of a current viewing perspective. Additionally or alternatively to one or more of the examples presented above, in some examples the method further comprises presenting each rotation affordance as an arc in a different plane defined by two of the plurality of object axes. Additionally or alternatively to one or more of the examples presented above, in some examples the method further comprises hovering over an area in a particular plane defined by a particular rotation affordance and within the arc of the particular rotation affordance, after hovering over the area, presenting a two-axis translation affordance within the area in the particular plane, receiving input representing selection and movement of the two-axis translation affordance, and while receiving the input representing the movement of the two-axis translation affordance, translating the selected virtual object along the particular plane in a two-dimensional translation. Additionally or alternatively to one or more of the examples presented above, in some examples an amount of the two-dimensional translation of the selected virtual object is the same as the amount of the movement of the two-axis translation affordance. Additionally or alternatively to one or more of the examples presented above, in some examples an amount of the two-dimensional translation of the selected virtual object is different from the amount of the movement of the two-axis translation affordance. Additionally or alternatively to one or more of the examples presented above, in some examples presenting the object manipulator includes presenting a plurality of scale affordances distinct from the plurality of rotation affordances, each scale affordance for scaling the virtual object. Additionally or alternatively to one or more of the examples presented above, in some examples each scale affordance is associated with a different object axis, and the method further comprises, while presenting the plurality of scale affordances, receiving input representing selection of a particular scale affordance, after receiving the input representing selection of the particular scale affordance, ceasing display of the other scale affordances, while presenting the selected scale affordance, receiving input representing translation of the selected scale affordance along the object axis associated with the selected scale affordance, and after receiving the input representing translation of the selected scale affordance along the object axis associated with the selected scale affordance, scaling the selected virtual object. Additionally or alternatively to one or more of the examples presented above, in some examples the method further comprises scaling the selected virtual object uniformly in all directions associated with each object axis. Additionally or alternatively to one or more of the examples presented above, in some examples the method further comprises while receiving the input representing selection of a particular scale affordance, receiving a modifier input, and after receiving the modifier input and the input representing translation of the selected scale affordance along the object axis associated with the selected scale affordance, scaling the selected virtual object nonuniformly in a first direction associated with the object axis of the selected scale affordance, while maintaining a size of the selected virtual object in other directions associated with the object axis of unselected scale affordances. Additionally or alternatively to one or more of the examples presented above, in some examples the method further comprises scaling the selected virtual object in a second direction opposite the first direction associated with the object axis of the selected scale affordance. Additionally or alternatively to one or more of the examples presented above, in some examples presenting the object manipulator includes presenting a plurality of single-axis translation affordances, each single-axis translation affordance for translating the virtual object. Additionally or alternatively to one or more of the examples presented above, in some examples each single-axis translation affordance is associated with a different object axis, and the method further comprises, while presenting the plurality of single-axis translation affordances, receiving input representing selection of a particular single-axis translation affordance, after receiving the input representing selection of the particular single-axis translation affordance, ceasing display of the other single-axis translation affordances, while presenting the selected single-axis translation affordance, receiving input representing a first single-dimension translation of the selected single-axis translation affordance along the object axis associated with the selected single-axis translation affordance, and after receiving the input representing translation of the selected single-axis translation affordance along the object axis associated with the selected single-axis translation affordance, translating the selected virtual object in a second single-dimension translation along the object axis associated with the selected single-axis translation affordance. Additionally or alternatively to one or more of the examples presented above, in some examples an amount of the second single-dimension translation is the same as the amount of the first single-dimension translation. Additionally or alternatively to one or more of the examples presented above, in some examples an amount of the second single-dimension translation is different from the amount of the first single-dimension translation. Additionally or alternatively to one or more of the examples presented above, in some examples presenting the object manipulator includes presenting a center of object affordance for omnidirectional translation of the virtual object. Additionally or alternatively to one or more of the examples presented above, in some examples the method further comprises, while presenting the center of object affordance, receiving input representing selection of the center of object affordance, after receiving the input representing selection of the center of object affordance, receiving input representing translation of the selected center of object affordance in one or more directions, and after receiving the input representing translation of the selected center of object affordance in one or more directions, translating the selected virtual object in the one or more directions. Additionally or alternatively to one or more of the examples presented above, in some examples the method further comprises, while presenting the object manipulator but before receiving the input representing selection of a particular rotation affordance, receiving input representing highlighting of a particular rotation affordance, and after receiving the input representing highlighting of the particular rotation affordance, causing the particular rotation affordance to modify its appearance by one or more of thickening and brightening. Additionally or alternatively, in some examples a non-transitory computer readable storage medium stores instructions, which when executed by one or more processors, causes the one or more processors to perform a method according to one or more of the examples presented above. Additionally or alternatively, in some examples an electronic device comprises one or more processors, memory, and one or more programs, wherein the one or more programs are stored in the memory and configured to be executed by the one or more processors, the one or more programs including instructions for performing a method according to one or more of the examples presented above.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method, comprising:
at an electronic device in communication with a display and one or more input devices:
presenting, using the display, a graphical environment including a virtual object having a plurality of object axes;
while presenting the virtual object, receiving input representing selection of the virtual object;
after receiving the input representing selection of the virtual object, presenting an object manipulator along with the virtual object, the object manipulator having a plurality of affordances including a plurality of rotation affordances, each rotation affordance selectable to rotate the virtual object about a different object axis of the virtual object and each rotation affordance presented along a different plane defined by two different axes of the plurality of object axes;
while presenting the object manipulator, receiving input representing selection of a particular rotation affordance, the particular rotation affordance presented along a particular plane defined by two particular object axes of the plurality of object axes of the virtual object;
after receiving the input representing selection of the particular rotation affordance, enlarging the selected particular rotation affordance to surround the virtual object along the particular plane, and ceasing display of the other rotation affordances;
while presenting the selected particular rotation affordance, receiving input representing rotation of the selected particular rotation affordance; and
after receiving the input representing rotation of the selected particular rotation affordance, rotating the selected virtual object about a particular object axis of the virtual object orthogonal to the particular plane associated with the selected particular rotation affordance.

2. The method of claim 1, further comprising:
presenting the graphical environment from a viewing perspective of a particular octant in 3D space; and
relocating one or more affordances of the object manipulator as the viewing perspective changes such that the plurality of affordances of the object manipulator are in an octant of a current viewing perspective.

3. The method of claim 1, wherein presenting the object manipulator includes presenting a plurality of scale affordances distinct from the plurality of rotation affordances, each scale affordance selectable to scale the virtual object.

4. The method of claim 3, wherein each scale affordance is associated with a different object axis, the method further comprising:
while presenting the plurality of scale affordances, receiving input representing selection of a particular scale affordance;
after receiving the input representing selection of the particular scale affordance, ceasing display of the other scale affordances;
while presenting the selected scale affordance, receiving input representing translation of the selected scale affordance along an object axis associated with the selected scale affordance; and
after receiving the input representing translation of the selected scale affordance along the object axis associated with the selected scale affordance, scaling the selected virtual object.

5. The method of claim 4, further comprising scaling the selected virtual object uniformly in all directions associated with each object axis.

6. The method of claim 4, further comprising:
while receiving the input representing selection of a particular scale affordance, receiving a modifier input; and
after receiving the modifier input and the input representing translation of the selected scale affordance along the object axis associated with the selected scale affordance, scaling the selected virtual object nonuniformly in a first direction associated with the object axis of the selected scale affordance, while maintaining a size of the selected virtual object in other directions associated with the object axis of unselected scale affordances.

7. The method of claim 6, further comprising scaling the selected virtual object in a second direction opposite the first direction associated with the object axis of the selected scale affordance.

8. The method of claim 1, further comprising:
while presenting the object manipulator but before receiving the input representing selection of a particular rotation affordance, receiving input representing highlighting of a particular rotation affordance; and
after receiving the input representing highlighting of the particular rotation affordance, causing the particular rotation affordance to modify its appearance by one or more of thickening and brightening.

9. An electronic device comprising:
one or more processors;
memory; and
one or more programs, wherein the one or more programs are stored in the memory and configured to be executed by the one or more processors, the one or more programs including instructions which, when the one or more programs are executed by the one or more processors, cause the electronic device to perform a method comprising:
presenting, using a display, a graphical environment including a virtual object having a plurality of object axes;
while presenting the virtual object, receiving input representing selection of the virtual object;
after receiving the input representing selection of the virtual object, presenting an object manipulator along with the virtual object, the object manipulator having a plurality of affordances including a plurality of rotation affordances, each rotation affordance selectable to rotate the virtual object about a different object axis of the virtual object and each rotation affordance presented along a different plane defined by two different object axes of the plurality of object axes;

while presenting the object manipulator, receiving input representing selection of a particular rotation affordance, the particular rotation affordance presented along a particular plane defined by two particular object axes of the plurality of object axes of the virtual object;

after receiving the input representing selection of the particular rotation affordance, enlarging the selected particular rotation affordance to surround the virtual object along the particular plane, and ceasing display of the other rotation affordances;

while presenting the selected particular rotation affordance, receiving input representing rotation of the selected particular rotation affordance; and after receiving the input representing rotation of the selected particular rotation affordance, rotating the selected virtual object about a particular object axis of the virtual object orthogonal to the particular plane associated with the selected particular rotation affordance.

10. The electronic device of claim 9, the one or more programs including further instructions for performing the method, the method further comprising presenting each rotation affordance as an arc.

11. The electronic device of claim 10, the one or more programs including further instructions for performing the method, the method further comprising:

hovering over an area in a particular plane defined by a particular rotation affordance and within the arc of the particular rotation affordance;

after hovering over the area, presenting a two-axis translation affordance within the area in the particular plane;

receiving input representing selection and movement of the two-axis translation affordance; and while receiving the input representing the movement of the two-axis translation affordance, translating the selected virtual object along the particular plane in a two-dimensional translation.

12. The electronic device of claim 11, wherein an amount of the two-dimensional translation of the selected virtual object is corresponds to an amount of the movement of the two-axis translation affordance.

13. The electronic device of claim 11, wherein an amount of the two-dimensional translation of the selected virtual object is different from an amount of the movement of the two-axis translation affordance.

14. The electronic device of claim 10, wherein presenting the object manipulator includes presenting a plurality of single-axis translation affordances, each single-axis translation affordance selectable to translate the virtual object.

15. The electronic device of claim 14, wherein each single-axis translation affordance is associated with a different object axis, the method further comprising:

while presenting the plurality of single-axis translation affordances, receiving input representing selection of a particular single-axis translation affordance;

after receiving the input representing selection of the particular single-axis translation affordance, ceasing display of the other single-axis translation affordances;

while presenting the selected single-axis translation affordance, receiving input representing a first single-dimension translation of the selected single-axis translation affordance along the object axis associated with the selected single-axis translation affordance; and after receiving the input representing translation of the selected single-axis translation affordance along an object axis associated with the selected single-axis translation affordance, translating the selected virtual object in a second single-dimension translation along the object axis associated with the selected single-axis translation affordance.

16. The electronic device of claim 15, wherein an amount of the second single-dimension translation corresponds to an amount of the first single-dimension translation.

17. The electronic device of claim 15, wherein an amount of the second single-dimension translation is different from an amount of the first single-dimension translation.

18. A non-transitory computer readable storage medium storing instructions, which when executed by one or more processors, cause the one or more processors to:

at an electronic device in communication with a display and one or more input devices:

present, using the display, a graphical environment including a virtual object having a plurality of object axes;

while presenting the virtual object, receive input representing selection of the virtual object;

after receiving the input representing selection of the virtual object, present an object manipulator along with the virtual object, the object manipulator having a plurality of affordances including a plurality of rotation affordances, each rotation affordance selectable to rotate the virtual object about a different object axis of the virtual object and each rotation affordance presented along a different plane defined by two different object axes of the plurality of object axes;

while presenting the object manipulator, receive input representing selection of a particular rotation affordance, the particular rotation affordance presented along a particular plane defined by two particular object axes of the plurality of object axes of the virtual object;

after receiving the input representing selection of the particular rotation affordance, enlarge the selected particular rotation affordance to surround the virtual object along the particular plane, and cease display of the other rotation affordances;

while presenting the selected particular rotation affordance, receive input representing rotation of the selected particular rotation affordance; and after receiving the input representing rotation of the selected ring rotation affordance, rotate the selected virtual object about a particular object axis of the virtual object orthogonal to the particular plane associated with the selected particular rotation affordance.

19. The non-transitory computer readable storage medium of claim 18, wherein presenting the object manipulator includes presenting a center of object affordance that is selectable to translate the virtual object in one or more directions.

20. The non-transitory computer readable storage medium of claim 19, further storing instructions which, when executed by the one or more processors, further causes the one or more processors to:

while presenting the center of object affordance, receiving input representing selection of the center of object affordance;

after receiving the input representing selection of the center of object affordance, receiving input representing translation of the selected center of object affordance in one or more directions; and after receiving the input representing translation of the selected center of object affordance in one or more directions, translating the selected virtual object in the one or more directions.

\* \* \* \* \*